(12) United States Patent
Shen et al.

(10) Patent No.: US 12,169,064 B2
(45) Date of Patent: Dec. 17, 2024

(54) MICROSTRUCTURES FOR TRANSFORMING LIGHT HAVING LAMBERTIAN DISTRIBUTION INTO BATWING DISTRIBUTIONS

(71) Applicant: Brightview Technologies, Inc., Durham, NC (US)

(72) Inventors: Bing Shen, Cary, NC (US); Ken G. Purchase, Morrisville, NC (US); Thomas A. Rinehart, Durham, NC (US); John W. Wilson, Durham, NC (US)

(73) Assignee: Brightview Technologies, Inc., Durham, NC (US)

( * ) Notice: Subject to any disclaimer, the term of this patent is extended or adjusted under 35 U.S.C. 154(b) by 0 days.

(21) Appl. No.: 18/297,880

(22) Filed: Apr. 10, 2023

(65) Prior Publication Data

US 2023/0243482 A1     Aug. 3, 2023

Related U.S. Application Data

(63) Continuation of application No. 17/841,713, filed on Jun. 16, 2022, now Pat. No. 11,655,957, which is a (Continued)

(51) Int. Cl.
  *F21V 5/00*     (2018.01)
  *F21Y 115/10*   (2016.01)

(52) U.S. Cl.
  CPC ........... *F21V 5/005* (2013.01); *F21Y 2115/10* (2016.08)

(58) Field of Classification Search
  CPC ..................................................... F21V 5/005
  See application file for complete search history.

(56) References Cited

U.S. PATENT DOCUMENTS

| 3,179,796 A | 4/1965 | Rolph |
| 3,829,680 A | 8/1974 | Jones |

(Continued)

FOREIGN PATENT DOCUMENTS

| CN | 1502096 A | 6/2004 |
| CN | 103460081 A | 12/2013 |

(Continued)

OTHER PUBLICATIONS

English translation of Qing-jian CN-205480452-U, published Aug. 2016 (Year: 2016).*

(Continued)

*Primary Examiner* — Evan P Dzierzynski
(74) *Attorney, Agent, or Firm* — Rauschenbach Patent Law Group, PLLC; Kurt Rauschenbach

(57) ABSTRACT

A light transmissive substrate for transforming a Lambertian light distribution into a batwing light distribution. The light transmissive substrate includes a first surface comprising a plurality of microstructures, and a second surface on a side of the substrate opposite the first surface. The substrate is configured to receive light in a Lambertian distribution from a light source at the first surface and transform the light into a batwing distribution exiting the second surface. The batwing distribution having a peak intensity at about ±30° to about ±60° from X and Y axes, and a minimum intensity at nadir.

11 Claims, 44 Drawing Sheets

Related U.S. Application Data continuation of application No. 16/962,155, filed as application No. PCT/US2019/015600 on Jan. 29, 2019, now Pat. No. 11,391,437.

(60) Provisional application No. 62/623,894, filed on Jan. 30, 2018.

(56) References Cited

U.S. PATENT DOCUMENTS

| | | |
|---|---|---|
| 7,092,166 B1 | 8/2006 | Wood |
| 7,190,387 B2 | 3/2007 | Rinehart et al. |
| 7,192,692 B2 | 3/2007 | Wood et al. |
| 7,525,126 B2 | 4/2009 | Leatherdale et al. |
| 7,628,514 B2 | 12/2009 | Hsu et al. |
| 7,645,058 B2 | 1/2010 | Kurokawa et al. |
| 7,845,826 B2 | 12/2010 | Aylward et al. |
| 7,867,695 B2 | 1/2011 | Freese et al. |
| 7,959,324 B2 | 6/2011 | Hsu |
| 8,047,673 B2 | 11/2011 | Santoro |
| 8,128,257 B2 | 3/2012 | Wood |
| 8,134,657 B2 | 3/2012 | Nakagome et al. |
| 8,662,687 B2 | 3/2014 | Weber et al. |
| 8,917,448 B2 | 12/2014 | Weber et al. |
| 8,974,069 B2 | 3/2015 | Purchase et al. |
| 8,988,776 B2 | 3/2015 | Weber et al. |
| 9,341,754 B2 | 5/2016 | Maekawa et al. |
| 9,431,632 B2 | 8/2016 | Inoue et al. |
| 9,483,965 B2 | 11/2016 | Zhou et al. |
| 9,765,949 B2 | 9/2017 | Shen et al. |
| 9,817,178 B2 | 11/2017 | Fan |
| 10,072,816 B2 | 9/2018 | Shen et al. |
| 10,203,075 B1 * | 2/2019 | Kim .................... F21S 4/28 |
| 10,302,275 B2 | 5/2019 | Purchase |
| 10,317,583 B2 | 6/2019 | Purchase |
| 11,022,271 B2 * | 6/2021 | Reutter ............... G02B 5/0278 |
| 11,360,350 B2 | 6/2022 | Tsai et al. |
| 11,391,437 B2 | 7/2022 | Shen et al. |
| 11,441,756 B2 * | 9/2022 | Aspell .................... F21V 5/005 |
| 11,655,957 B2 | 5/2023 | Shen et al. |
| 2004/0051450 A1 | 3/2004 | George et al. |
| 2004/0190102 A1 | 9/2004 | Mullen et al. |
| 2006/0163988 A1 | 7/2006 | Kang et al. |
| 2006/0250707 A1 | 11/2006 | Whitney et al. |
| 2007/0284565 A1 | 12/2007 | Leatherdale et al. |
| 2008/0094831 A1 | 4/2008 | Matsumoto |
| 2008/0247172 A1 | 10/2008 | Beeson et al. |
| 2009/0262428 A1 | 10/2009 | Kurokawa |
| 2010/0328575 A1 | 12/2010 | Shinkai et al. |
| 2012/0081926 A1 * | 4/2012 | Yu ....................... G02B 6/0016 362/619 |
| 2012/0257376 A1 | 10/2012 | Zhou et al. |
| 2012/0305965 A1 * | 12/2012 | Tseng ................... H01L 33/007 257/98 |
| 2013/0025670 A1 * | 1/2013 | Sato .................... H01L 21/2255 257/E21.135 |
| 2013/0070478 A1 * | 3/2013 | Edamitsu ................. F21V 5/02 362/311.06 |
| 2014/0376220 A1 * | 12/2014 | Shen ................... B29D 11/0074 362/339 |
| 2015/0029717 A1 | 1/2015 | Shen et al. |
| 2016/0123547 A1 | 5/2016 | Geisler et al. |
| 2016/0282523 A1 | 9/2016 | Liu |
| 2017/0097448 A1 | 4/2017 | Wang et al. |
| 2017/0146214 A1 | 5/2017 | Purchase |
| 2019/0227382 A1 | 7/2019 | Watanabe et al. |
| 2020/0176650 A1 | 6/2020 | Achi et al. |
| 2020/0249529 A1 | 8/2020 | Yamada et al. |
| 2020/0341183 A1 | 10/2020 | Yonemoto et al. |
| 2020/0408383 A1 | 12/2020 | Shen et al. |
| 2021/0262621 A1 | 8/2021 | Eom |
| 2022/0307672 A1 | 9/2022 | Shen et al. |

FOREIGN PATENT DOCUMENTS

| | | | |
|---|---|---|---|
| CN | 205480452 U | * | 8/2016 |
| CN | 107966856 A | | 4/2018 |
| CN | 109188772 A | | 1/2019 |
| CN | 111670317 A | | 9/2020 |
| EP | 3746696 A1 | | 12/2020 |
| JP | 2005-241919 A | | 9/2005 |
| JP | 2008-242269 A | | 10/2008 |
| JP | 2009-086031 A | | 4/2009 |
| JP | 2009-265616 A | | 11/2009 |
| JP | 2010-044378 A | | 2/2010 |
| JP | 2011-076115 A | | 4/2011 |
| JP | 2011-123379 A | | 6/2011 |
| JP | 2011-243518 A | | 12/2011 |
| JP | 2012-094266 A | | 5/2012 |
| JP | 2012-114003 A | | 6/2012 |
| JP | 2012-234047 A | | 11/2012 |
| JP | 2012-242764 A | | 12/2012 |
| JP | 2013-030404 A | | 2/2013 |
| JP | 5167993 B2 | | 3/2013 |
| JP | 2021-512455 A | | 5/2021 |
| JP | 7436369 B2 | | 2/2024 |
| KR | 2003-0080764 A | | 10/2003 |
| KR | 10-2020-0115510 A | | 10/2020 |
| WO | 2002/075706 A2 | | 9/2002 |
| WO | 2005/083317 A1 | | 9/2005 |
| WO | 2006/073916 A1 | | 7/2006 |
| WO | 2006/121690 A1 | | 11/2006 |
| WO | 2010/141261 A2 | | 12/2010 |
| WO | 2012/015013 A1 | | 2/2012 |
| WO | 2012/138898 A1 | | 10/2012 |
| WO | 2018/155304 A1 | | 8/2018 |
| WO | 2019/152382 A1 | | 8/2019 |

OTHER PUBLICATIONS

Decision on Rejection received for corresponding Chinese Patent Application No. 201980010984.2, mailed on May 13, 2023, 11 pages including 7 pages of English translation.

Office Action received for corresponding Japanese Patent Application No. 2020-540327, mailed on May 30, 2023, 11 pages including 6 pages of English translation.

Chang et al., "Fabrication and optical design of a pyramid microstructure for the base of a light guide used in backlight module" Journal of Micro/Nanolithography, MEMS, and MOEMS, vol. 9, Issue 4, Oct. 2010, Retrieved from: <<https://doi.org/10.1117/1.3517108>>, pp. 043006-0-043006-9.

Chien et al., "Fabrication of integrated light guiding plate for backlight system" Proceedings vol. 6109, Micromachining and Microfabrication Process Technology XI, Retrived from <<https://doi.org/10.1117/12.647115>>, Jan. 23, 2006, pp. 610909-1-610909-8.

Extended European Search Report received for EP Patent Application Serial No. 19747203.8, mailed on Sep. 15, 2021, 11 pages.

International Preliminary Report on Patentability received for PCT Patent Application No. PCT/US2019/015600, mailed on Aug. 13, 2020, 7 pages.

International Search Report and Written Opinion received for PCT Patent Application No. PCT/US2019/015600, mailed on Apr. 24, 2019, 7 pages.

Office Action received for Chinese Patent Application No. 201980010984.2, mailed on Apr. 29, 2022, 12 pages including 6 pages of English Translation.

Office Action received for Chinese Patent Application No. 201980010984.2, mailed on Sep. 21, 2022, 12 pages including 5 pages of English Translation.

Office Action received for European Patent Application No. 19747203.8, mailed on May 3, 2023, 5 pages.

Office Action received for Japanese Patent Application No. 2020-540327, mailed on Oct. 4, 2022, 10 pages including 5 pages of English Translation.

(56) References Cited

OTHER PUBLICATIONS

Preliminary Rejection Received for corresponding Korea Patent Application No. 10-2020-7021791, mailed on Jan. 10, 2024, 11 pages including 6 pages of English translation.

* cited by examiner

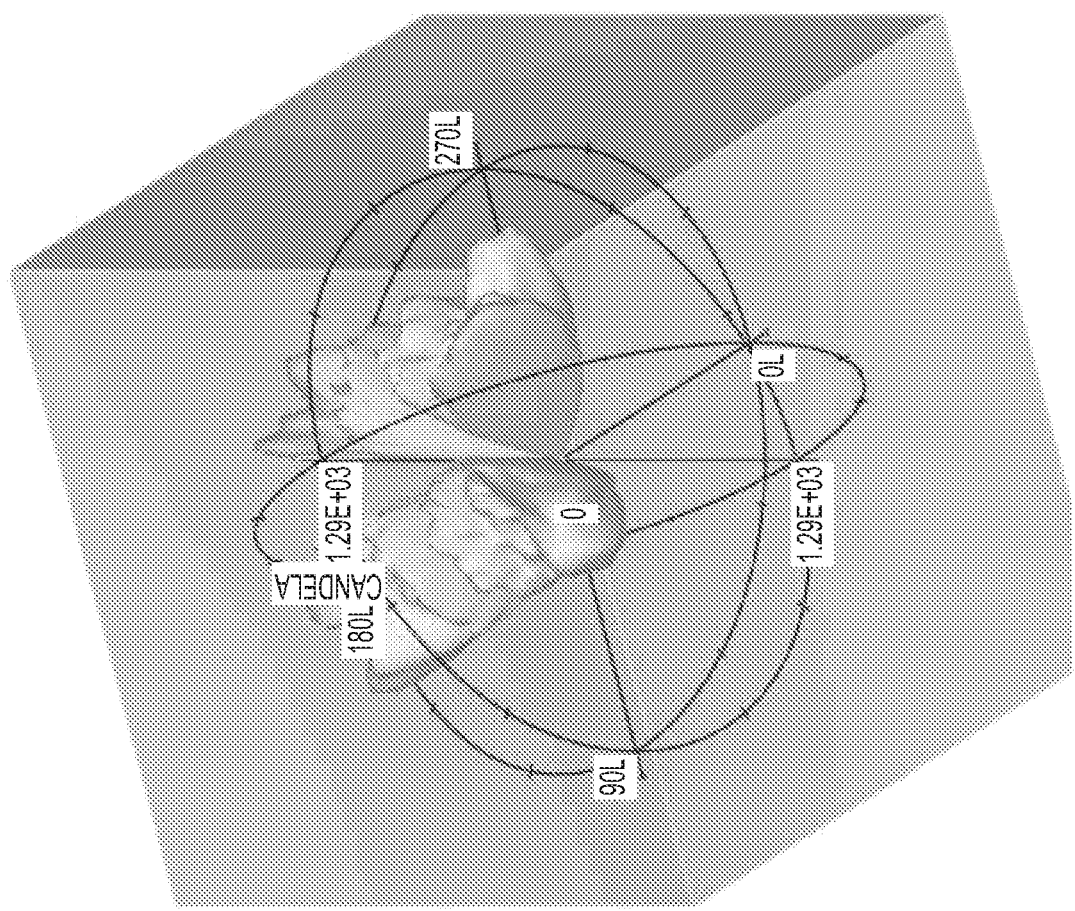

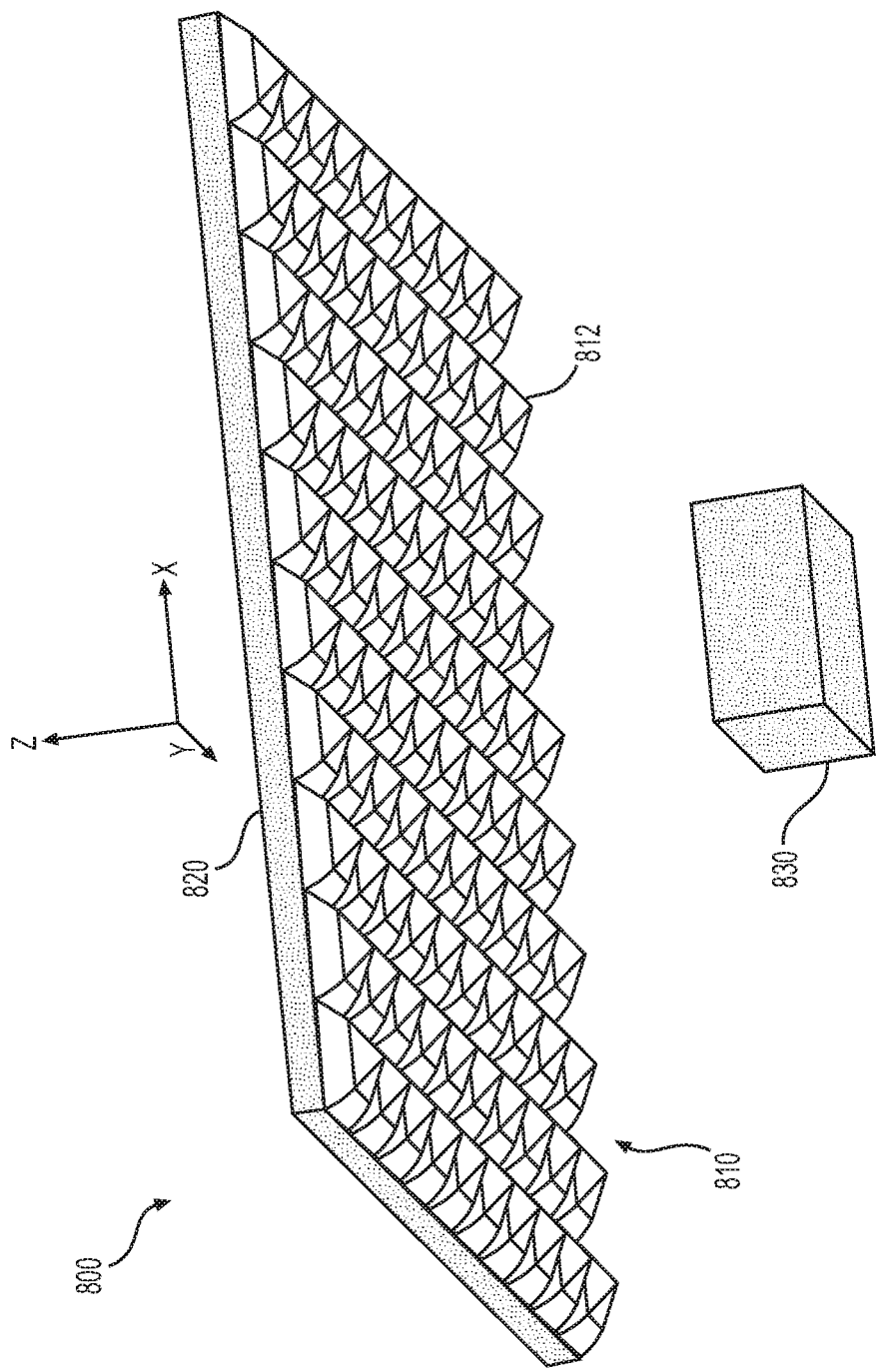

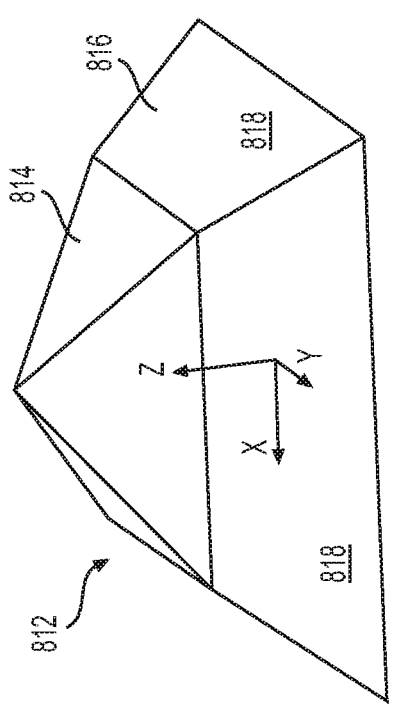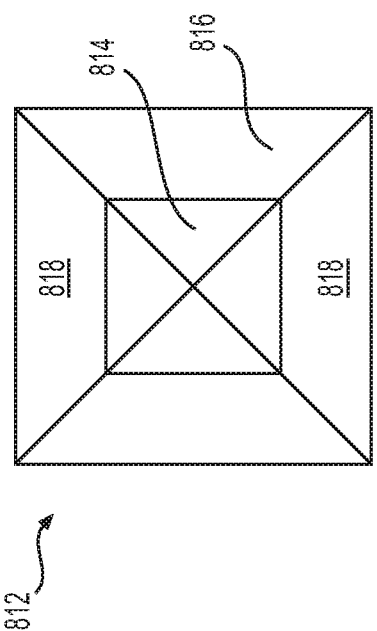

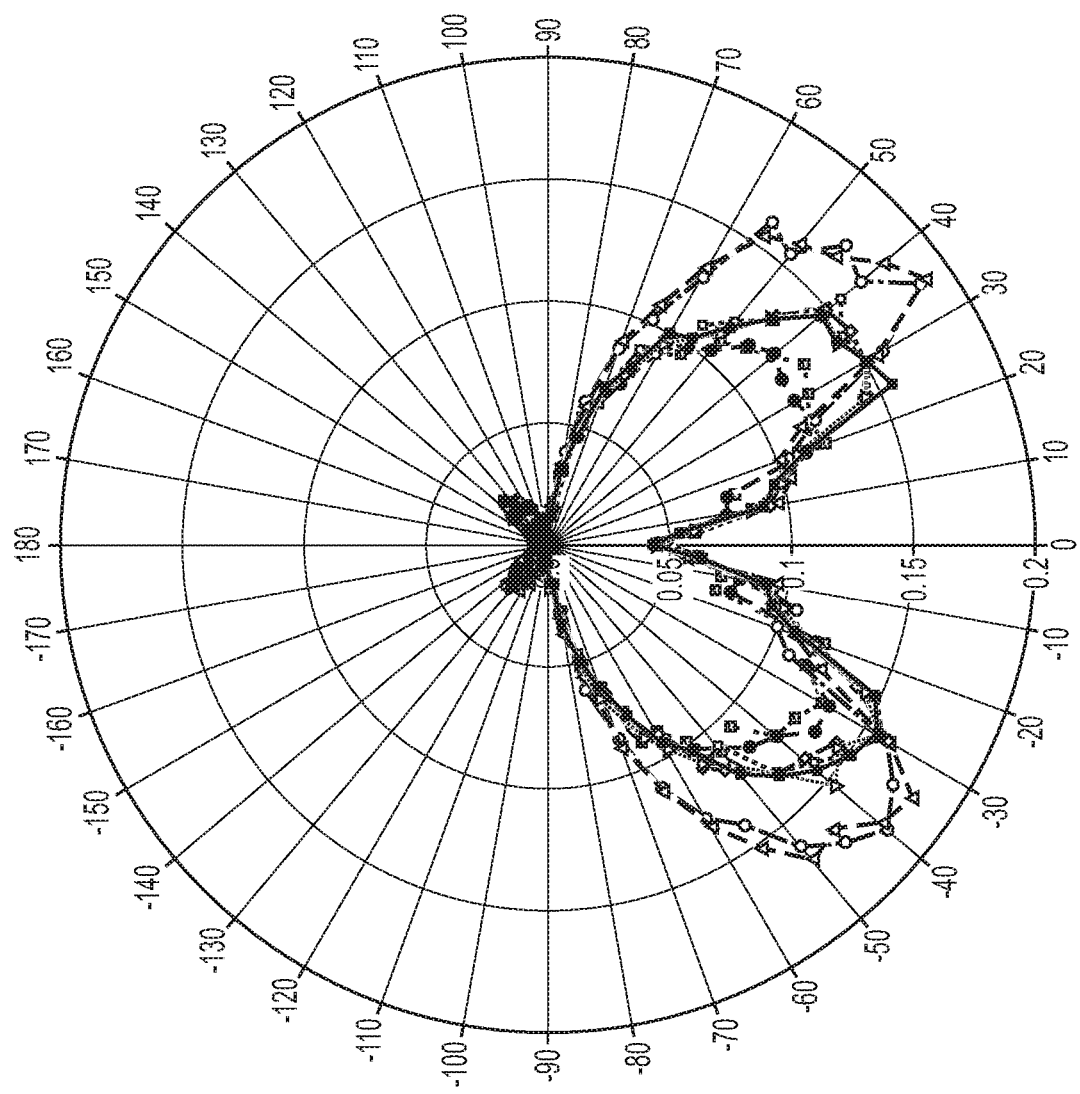

MICROSTRUCTURES FOR TRANSFORMING LIGHT HAVING LAMBERTIAN DISTRIBUTION INTO BATWING DISTRIBUTIONS

RELATED APPLICATION SECTION

The present application is a continuation of U.S. patent application Ser. No. 17/841,713, entitled "Microstructures for Transforming Light Having Lambertian Distribution into Batwing Distributions", filed on Jun. 16, 2022, which is a continuation of U.S. Pat. No. 11,391,437, entitled "Microstructures for Transforming Light Having Lambertian Distribution Into Batwing Distributions", filed on Jul. 14, 2020, which is a National Stage Entry into the United States Patent and Trademark Office from International Patent Application No. PCT/US2019/015600, filed on Jan. 29, 2019, which relies for priority on U.S. Provisional Patent Application Ser. No. 62/623,894, entitled "Microstructures for Transforming Light Having Lambertian Distribution into Batwing Distributions," filed Jan. 30, 2018, the entire content contents all of these applications are hereby incorporated by reference.

FIELD

The present invention is related to micro light transmitting optics and microstructures for transforming light having a Lambertian distribution into batwing distributions for large area uniform illumination.

BACKGROUND

Light emitting diodes (LEDs) have quickly become the primary light generating device for current applications. Intrinsically, an LED emits the light in a Lambertian distribution, characterized by the strongest intensity at the emitting direction (zero degrees or "nadir"). Light intensity decreases following the cosine function of the angles deviated from the zero-degree (nadir) emitting direction and reduces to zero as the angle reaches 90 degrees from nadir, as illustrated in FIG. 1. When an LED is used to illuminate a flat surface target, the light traveling path length varies for different target locations. Typically, the path length is the shortest at the zero-degree direction where the LED emits the highest light intensity, which forces designers to increase the light source density to achieve a good illumination uniformity.

For applications that require uniform or even illumination over a desired area of a flat plane with low light source density, such as the back light units for displays or lighting projects for a large area, the light source should deliver light energy in the reverse fashion of a Lambertian distribution, i.e. reduced intensity at zero degrees (nadir) and high intensity at angles away from nadir, as shown in FIG. 2, for example. Such a distribution profile (illustrated in FIG. 2) is often referred as a "batwing" distribution and is more desirable for achieving uniform illumination.

Transforming a Lambertian distribution emitted by, for example, an LED light source into a batwing distribution may be achieved efficiently for some applications, such as some lighting applications, by using bulk optical lenses with specifically designed shapes. Such structures may not be feasible for many applications in which LEDs are used, such as in displays of cell phones, smart phones, tablets, laptop computers, etc., due to the structure bulkiness of implanting such solutions. It is desirable to transform a Lambertian distribution into a batwing distribution with structures that are more compact than current optical lenses.

SUMMARY

It has been found that micro optical transmissive structures that are fabricated on a light transmissible substrate may be used to perform the desired transformation functions to transform a Lambertian distribution into a desired batwing distribution so that a substantially uniform illumination may be provided to a large area relative to the size of an LED light source. Embodiments of the present invention are described below.

According to an aspect of the invention, there is provided a light transmissive substrate for transforming a Lambertian light distribution into a batwing light distribution. The light transmissive substrate includes a first surface comprising a plurality of microstructures, and a second surface on a side of the substrate opposite the first surface. The substrate is configured to receive light in a Lambertian distribution from a light source at the first surface and transform the light into a batwing distribution exiting the second surface. The batwing distribution has a peak intensity at about ±30° to about ±60° from X and Y axes and a minimum intensity at nadir.

In an embodiment, each of the plurality of microstructures has a shape of a pyramid extending in a direction away from the second surface. In an embodiment, at least the microstructures are made from material having a refractive index of about 1.5, and the pyramid has a roof angle of between about 70° and about 95°.

In an embodiment, each pyramid has a base portion and a top portion connected to the base portion. The top portion includes a tip of the pyramid and has sides disposed at different angles than sides of the base portion.

In an embodiment, at least the microstructures are made from material having a refractive index of about 1.5, the sides of the base portion are disposed at angles of about 55° relative to a plane substantially parallel to the second surface, and the top portion has a roof angle of between about 85° and about 90°.

In an embodiment, each of the plurality of microstructures has a shape of a frustum of a pyramid and a recess in a shape of a reverse pyramid. In an embodiment, at least the microstructures are made from material having a refractive index of about 1.5, sides of the frustum are disposed at angles of about 55° relative to a plane substantially parallel to the second surface, and the reverse pyramid has a roof angle of between about 85° and about 90°.

In an embodiment, each of the plurality of microstructures has a shape of a corner cube.

In an embodiment, the second surface is substantially planar.

In an embodiment, the second surface comprises a texture.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

FIG. 5A is an isometric view of a transferred batwing intensity distribution three-dimensional polar chart for the embodiment of FIG. 4A having microstructures with roof angles of 90 degrees;

FIG. 8A is an isometric schematic view of an LED light source and a single light transmissive substrate with microstructures in accordance with an embodiment of the invention;

FIG. 8B is an isometric schematic view of a single microstructure of the substrate of FIG. 8A;

FIG. 8C is a top schematic view of the single microstructure of FIG. 8B;

FIG. 9C is a two-dimensional polar chart of the transferred batwing intensity distribution for the embodiment of FIG. 8A with the microstructures having a refractive index of 1.5;

DETAILED DESCRIPTION

Embodiments of the present invention provide light transmissive substrates having microstructures that may provide the desired effect of transforming a Lambertian intensity distribution received from a light source, such as an LED, into a batwing intensity distribution that has maximum intensity away from nadir and at about ±30° to about ±60° from X and Y axes, and minimum intensity at nadir.

Figure 1:
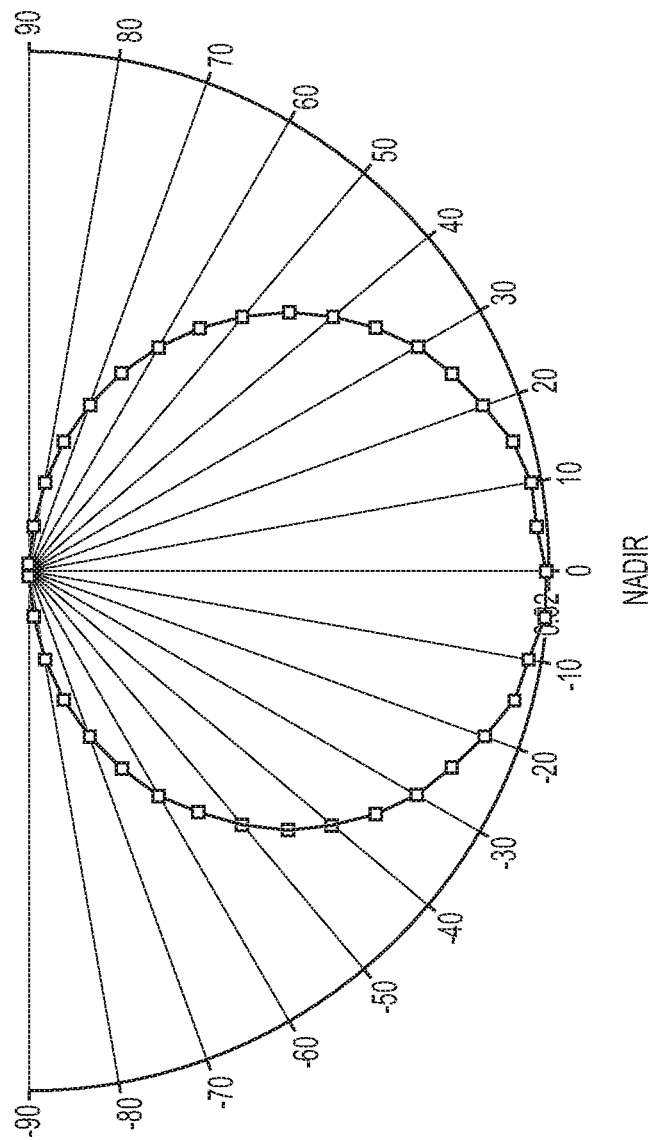
FIG. 1 is a two-dimensional polar chart of a Lambertian intensity distribution.
Figure 2:
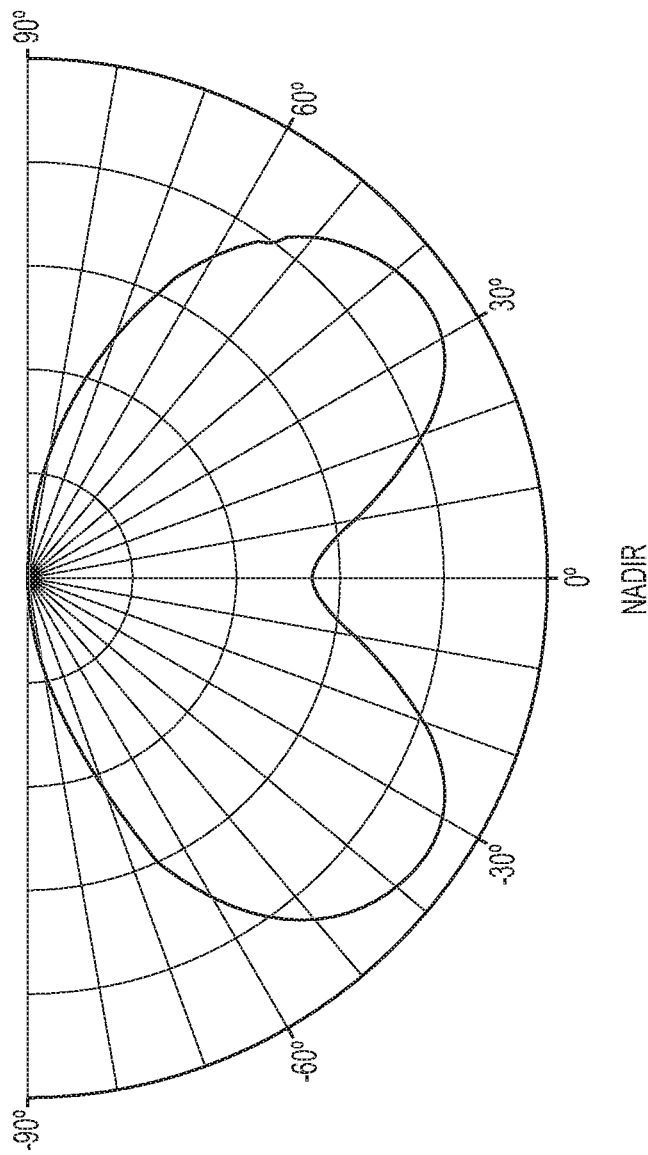
FIG. 2 is a two-dimensional polar chart of a batwing-type intensity distribution.
Figure 3:
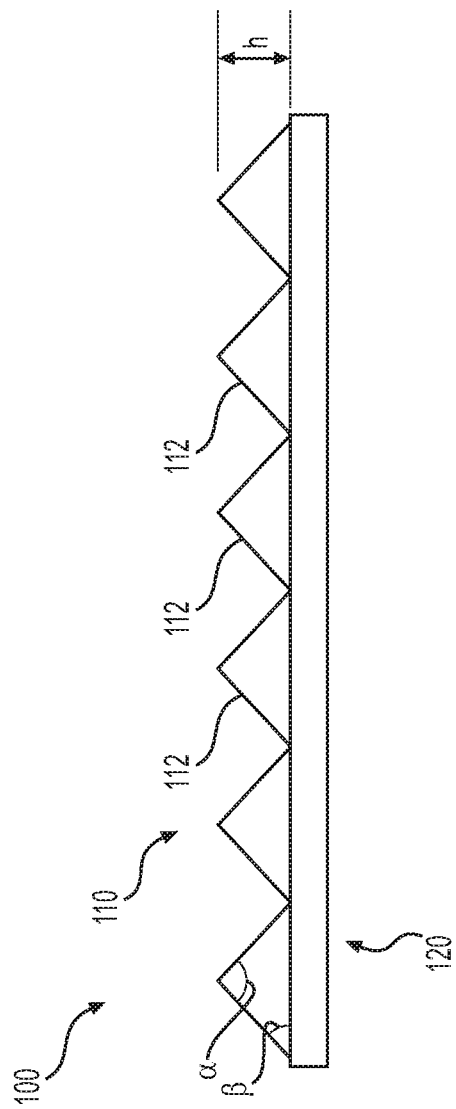
FIG. 3 is a schematic side view of a light transmissive substrate in accordance with embodiments of the invention.

FIG. 3 is a schematic illustration of a light transmissive substrate 100 for transforming a Lambertian light distribution into a batwing light distribution in accordance with embodiments of the invention. The substrate 100 includes a first surface 110 that includes a plurality of microstructures 112, and a second surface 120 on a side of the substrate 100 opposite the first surface 110.

As discussed in further detail below, the substrate 100 is configured to receive light in a Lambertian distribution from a light source at the first surface 110 and transform the light into a batwing distribution exiting the second surface 120. The resulting batwing distribution desirably has a peak intensity in a range of about ±30° to about ±60° from X and Y axes and a minimum intensity at nadir. In an embodiment, the light transmissive substrate 100 may provide a batwing distribution that has a peak intensity at about ±45 from X and Y axes and a minimum (near zero) intensity at nadir. In some embodiments of the invention, at least the light transmissive microstructures are made from a material having a refractive index of about 1.5, although materials having different refractive indices may also be used as long as the desired effect can be achieved. In some embodiments of the invention, the rest of the substrate is a film made of a material that also has a refractive index of about 1.5, or a refractive index that matches or substantially matches the refractive index of the microstructures. For light sources that emit infrared beams, infrared transmitting materials that may not be transparent in the visible range of light may be used. Various embodiments of the invention are described in further detail below.

Figure 4A:
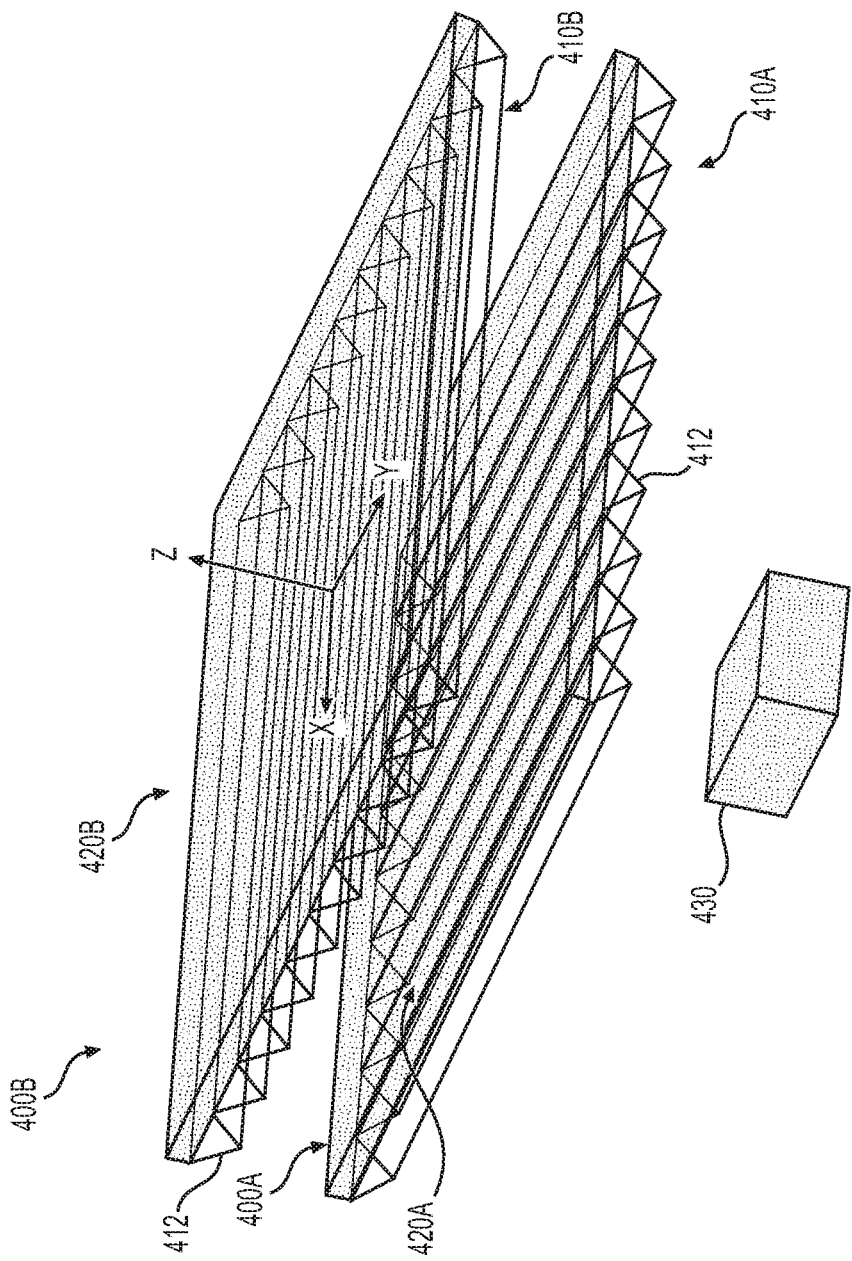
FIG. 4A is an isometric schematic view of an LED light source and a pair of light transmissive substrates with microstructures.
Figure 4B:
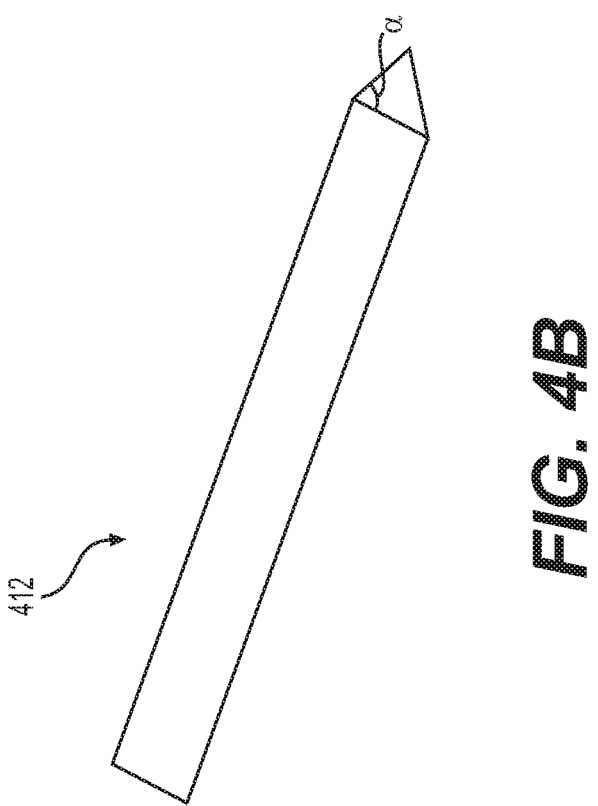
FIG. 4B is an isometric schematic view of a single microstructure of the substrates of FIG. 4A.

FIG. 4A illustrates two light transmissive substrates 400A, 400B, each having a plurality of microstructures 412 on first surfaces 410A, 410B thereof, that are oriented orthogonally to each other and placed above a light source 430 that outputs light in a Lambertian distribution. The first surfaces 410A, 410B of the light transmissive substrates 400A, 400B are oriented towards the light source 430 and second surfaces 420A, 420B of the substrates 400A, 400B are oriented away from the light source 430. FIG. 4B illustrates a single microstructure 412 in further detail. As illustrated, the microstructure 412 is in the form of a ridge that has a so-called roof angle or vertex α (see FIG. 3) of 90 degrees.

Light emitting from the light source 430 enters the first substrate 400A closest to the light source 430 via its first surface 410A, exits the first substrate 400A at its second surface 420A, enters the second substrate 400B at its first surface 410B, and exits the second substrate 400B at its second surface 420B. The different orientations of the microstructures 412 (i.e. being substantially perpendicular to each other) cause the light to bend and spread in two different directions and result in a net spread that is that is stronger and in a different direction relative to X and Y axes than if only one of the light transmissive substrates 400A, 400B is used.

Figure 5B:
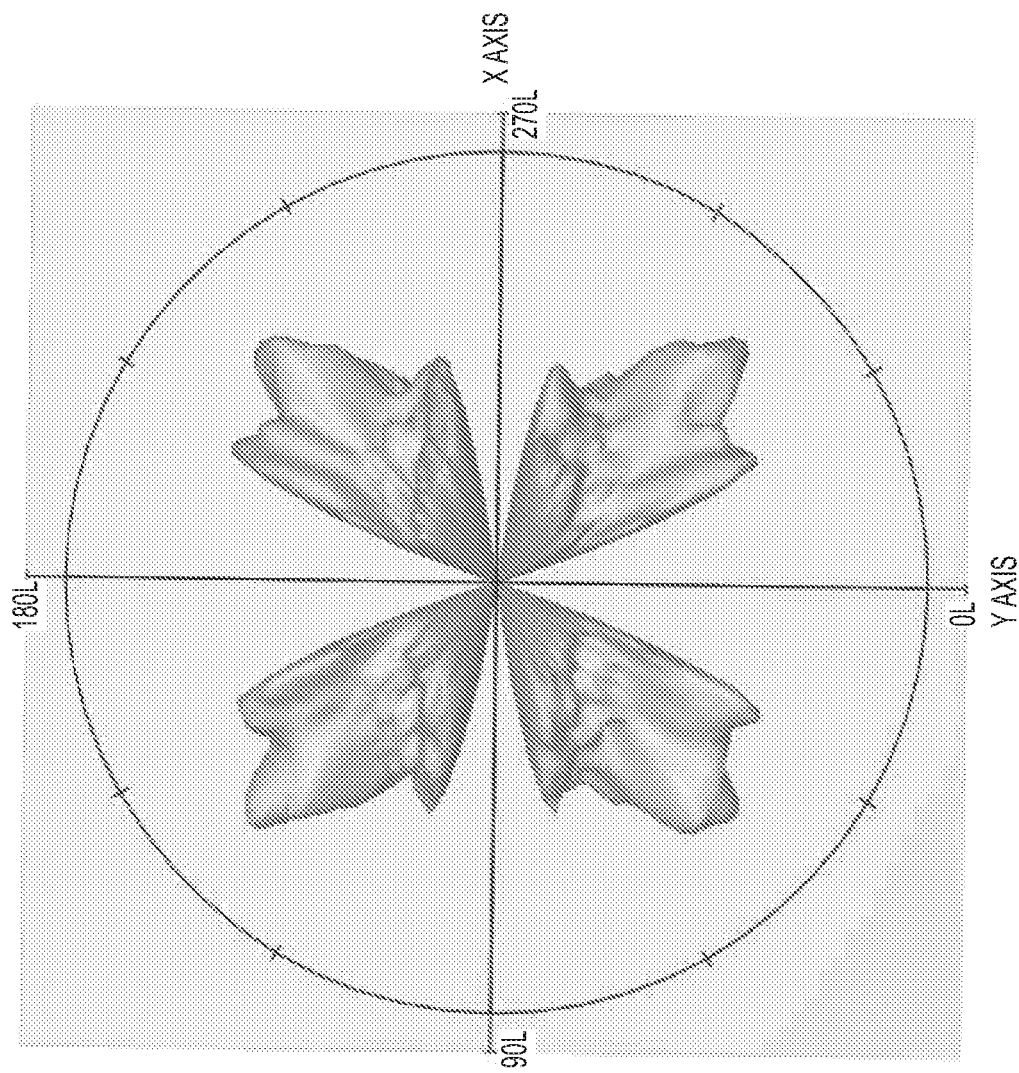
FIG. 5B is a top view of the three-dimensional polar chart of FIG. 5A.
Figure 5C:
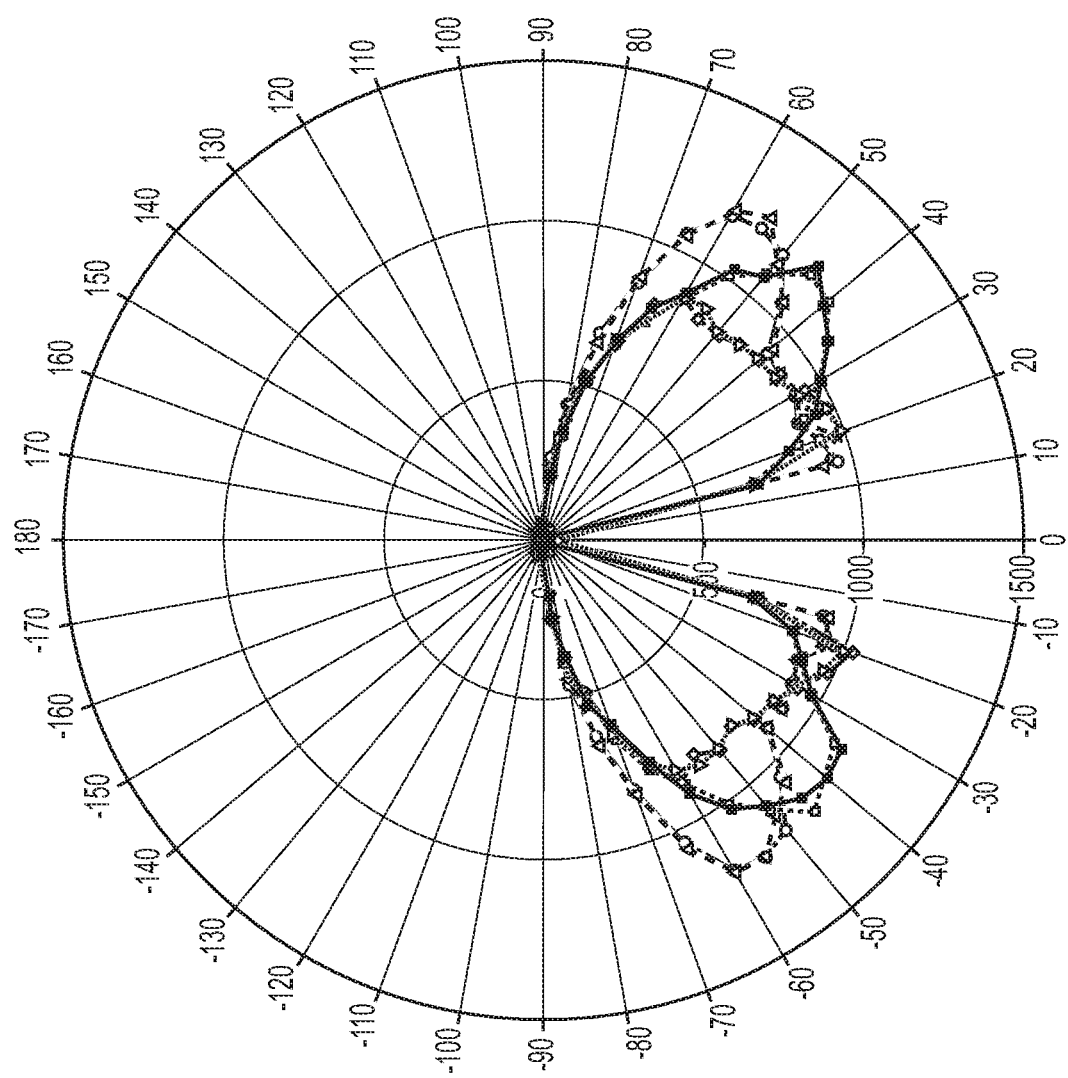
FIG. 5C is a two-dimensional polar chart of the transferred batwing intensity distribution for the embodiment of FIG. 4A having microstructures with roof angles of 90 degrees.

FIGS. 5A-5C illustrate three dimensional and two-dimensional representations of the light distribution provided by the combination of the two light transmissive substrates 400 having a refractive index of 1.5 and arranged as illustrated in FIG. 4A. As illustrated, light energy is not only steered away from the 0 degree (nadir) emitting direction, but also pushed toward four directions approximately 45 degrees from the primary X and Y axes as shown in FIGS. 5A and 5B. Along those directions, light typically travels the longest path length reaching the target area where stronger intensity is desired. Such a distribution may be desirable when there are multiple light sources arranged in a substantially square array, such as in back-lit displays or large area lighting applications (such as when lighting a warehouse). FIG. 5C is a 2D polar plot of the light intensity distributions represented by FIGS. 5A and 5B.

Figure 5D:
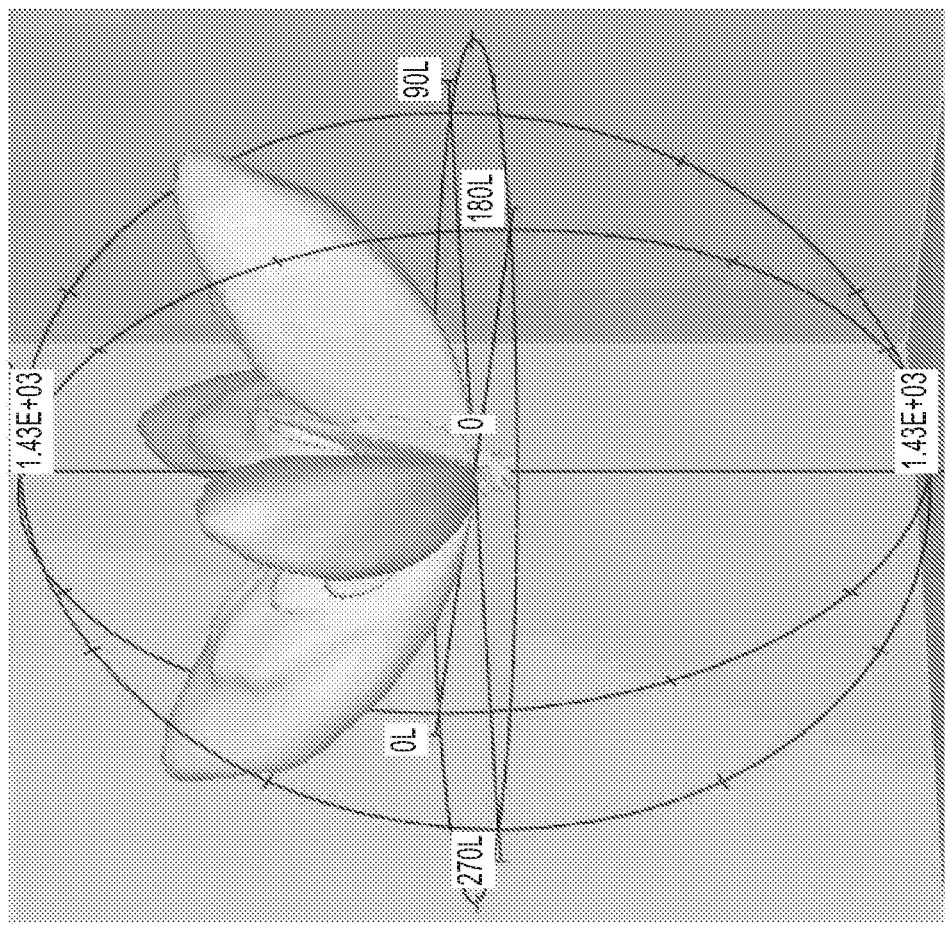
FIG. 5D is an isometric view of a transferred batwing intensity distribution three-dimensional polar chart for the embodiment of FIG. 4A having microstructures with roof angles of 85 degrees.
Figure 5E:
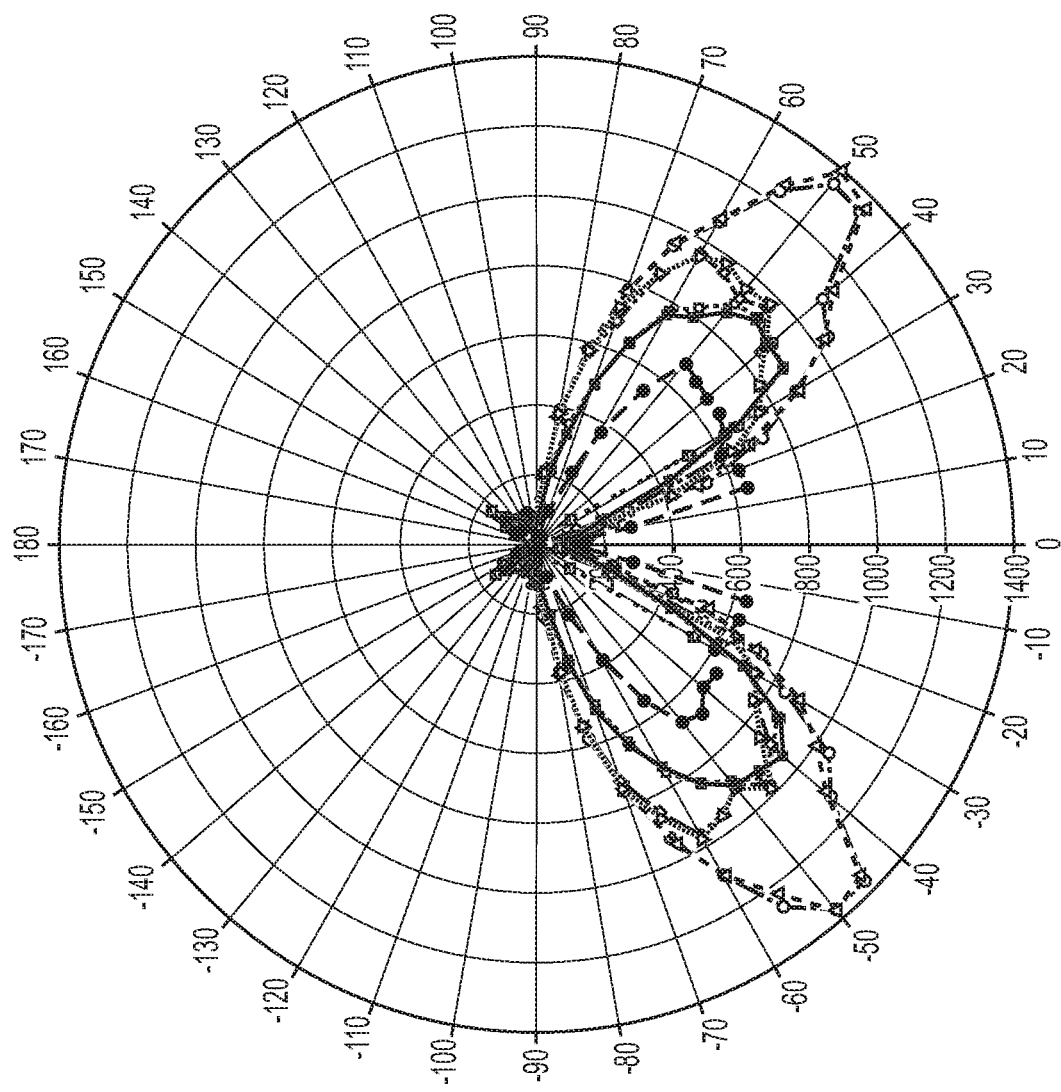
FIG. 5E is a two-dimensional polar chart of the transferred batwing intensity distribution for the embodiment of FIG. 4A with the microstructures having a refractive index of 1.5 and roof angles of 85 degrees.
Figure 5F:
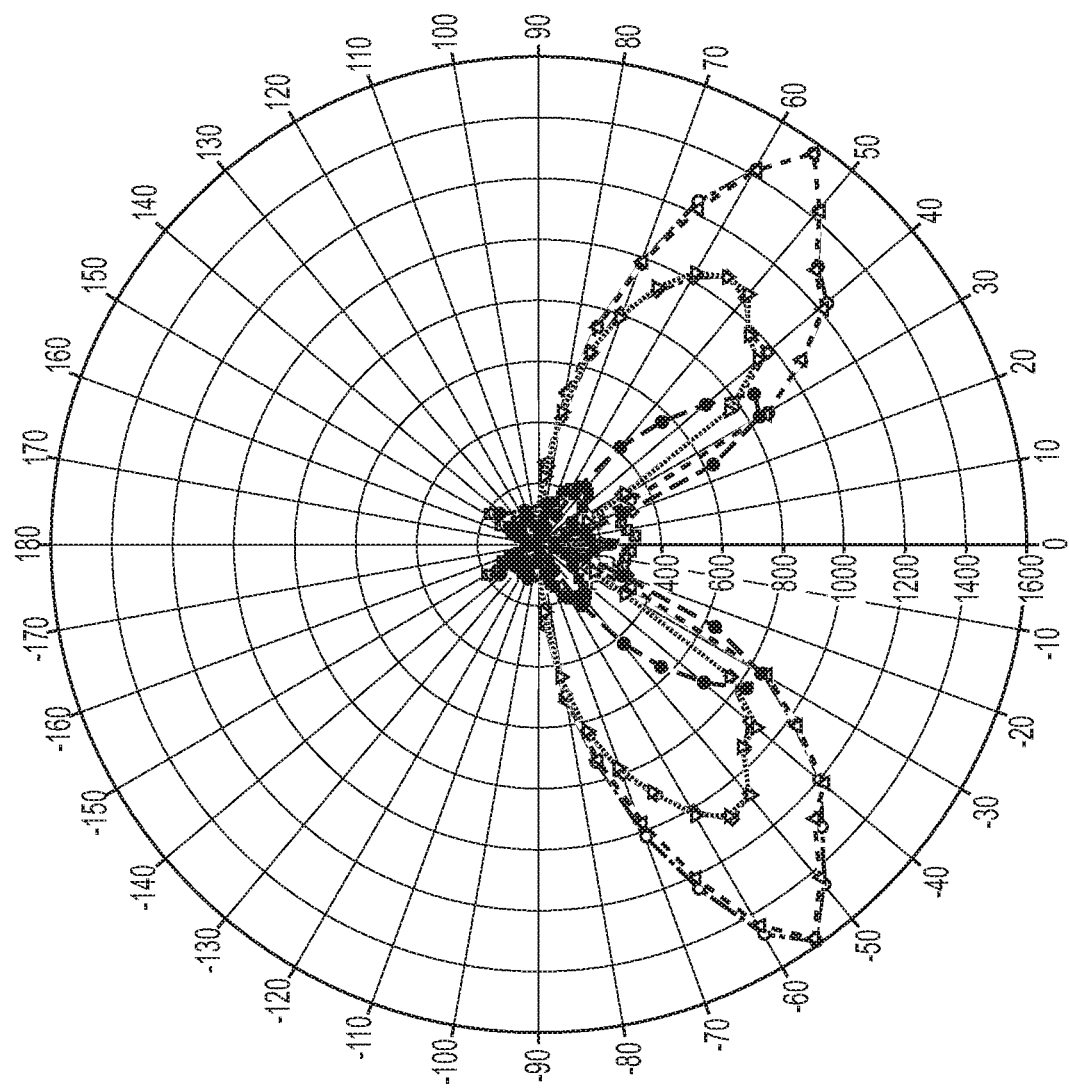
FIG. 5F is a two-dimensional polar chart of the transferred batwing intensity distribution for the embodiment of FIG. 4A with the microstructures having a refractive index of 1.6 and roof angles of 85 degrees.

The prism angles α on both substrates 400 may be adjusted to optimize the output distribution. For example, in an embodiment, the roof angle α of the ridges 412 on the substrates 400 may be 85 degrees. FIG. 5D illustrates a three dimensional representation of the light distribution provided by the combination of the two light transmissive substrates 400 having a refractive index of 1.5 with the ridges 412 having a roof angles of 85 degrees, and arranged as illustrated in FIG. 4A. FIG. 5E is a 2D polar plot of the light intensity distribution represented by FIG. 5D. FIG. 5F is a 2D polar plot of the light intensity distribution provided by the combination of the two light transmissive substrates 400 having a refractive index of 1.6 with the ridges 412 having a roof angles of 85 degrees, and arranged as illustrated in FIG. 4A. A comparison of FIGS. 5E and 5F shows the influence the refractive index has on the batwing spreading performance of the substrates.

Textures may be added to the second surface 420 of either or both substrates to fine tune the distribution profile and to enhance the optical transmission efficiencies.

Figure 6A:
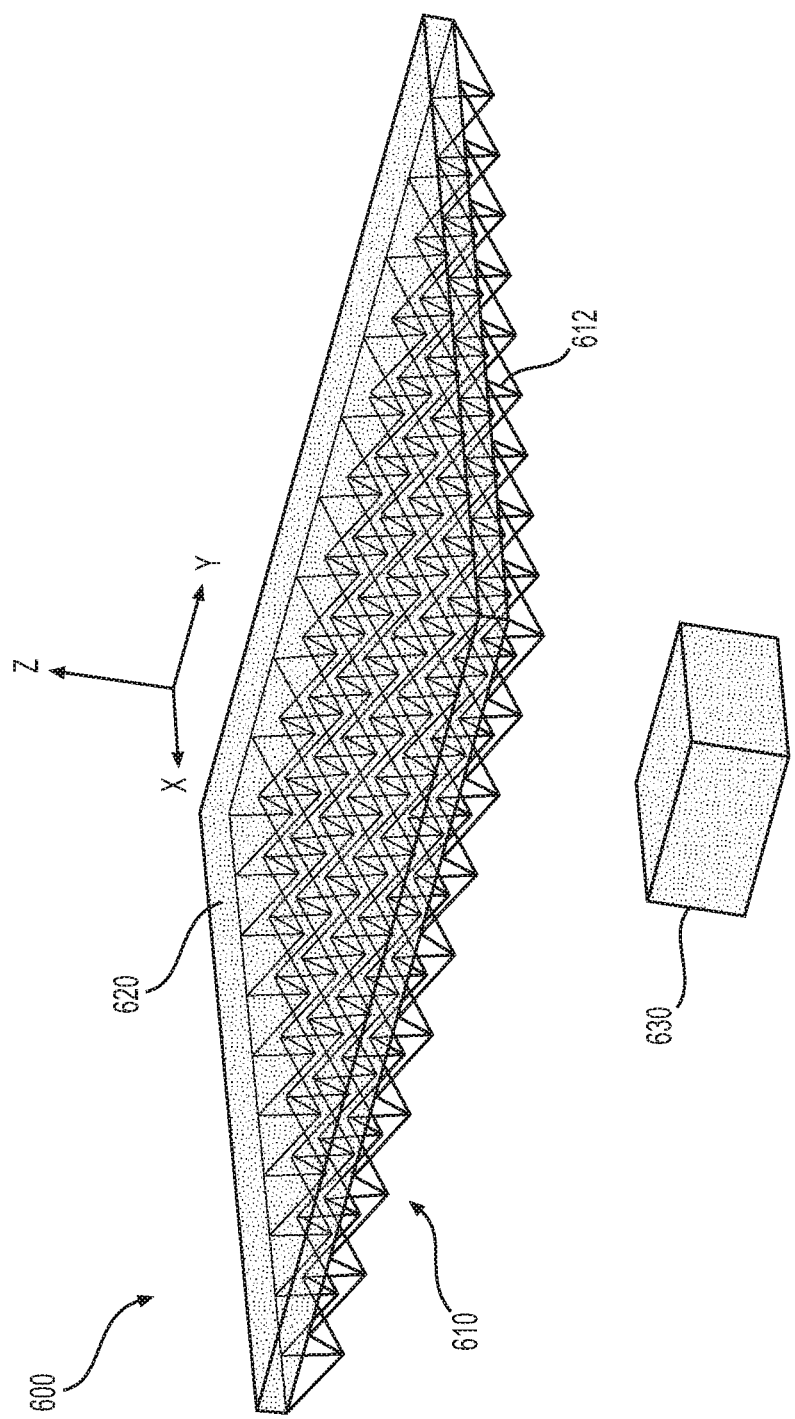
FIG. 6A is an isometric schematic view of an LED light source and a single light transmissive substrate with microstructures in accordance with an embodiment of the invention.
Figure 6B:
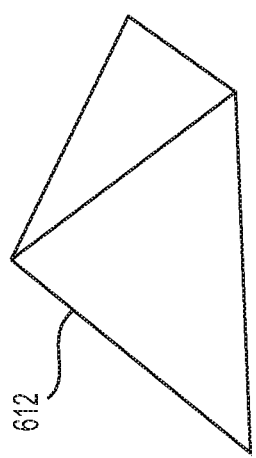
FIG. 6B is an isometric schematic view of a single microstructure of the substrate of FIG. 6A.
Figure 6C:
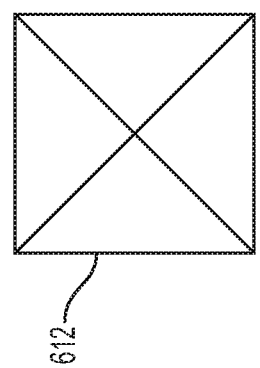
FIG. 6C is a top schematic view of the single microstructure of FIG. 6B.

FIG. 6A illustrates an embodiment of a light transmissive substrate 600 that has a plurality of microstructures 612 on a first surface 610 thereof. In this embodiment, the microstructures 612 are in the form of an array of micro-pyramids, each having four faces, that are placed above an LED light source 630 that outputs light in a Lambertian distribution. As depicted in FIG. 6A, the light enters the substrate 600 via the first surface 610 having the array of micro-pyramids 612 and exits a second surface 620 on an opposite side of the substrate 600 as the first surface 610. Each of the microstructures 612 has a roof angle α (see FIG. 3) of 90 degrees, and is shown in further detail in FIG. 6B (perspective view) and 6C (top view). Pyramid roof angles may be adjusted to optimize the output distribution, and textures may be added to the second surface 620 of the substrate 600 to fine tune the distribution profile and to enhance the optical transmission efficiencies.

Figure 7A:
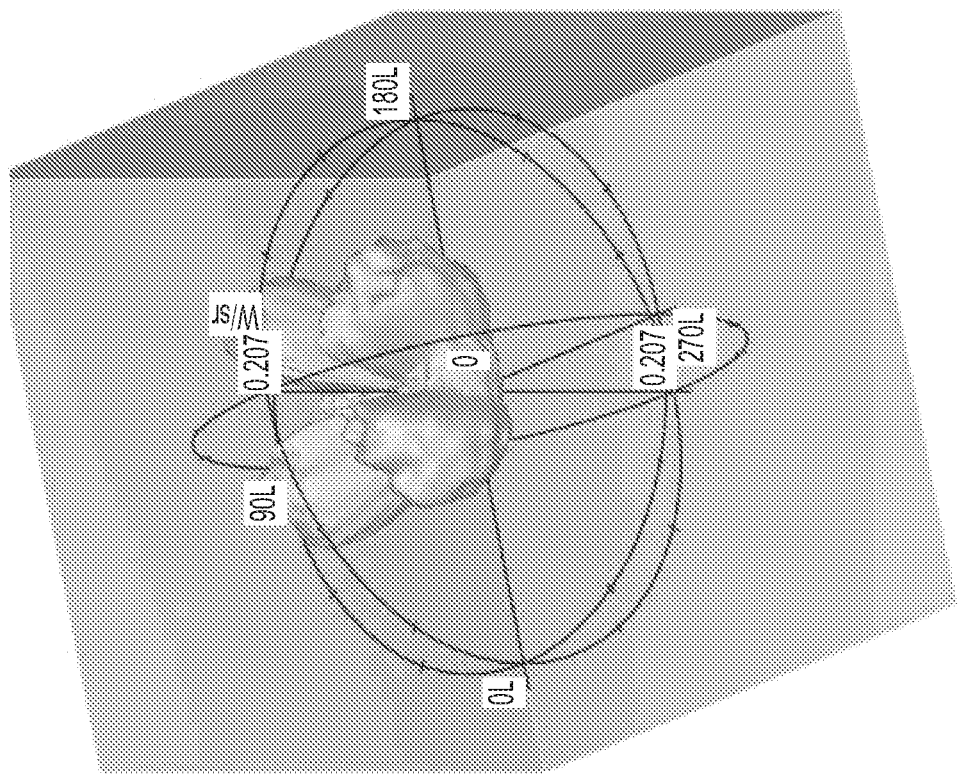
FIG. 7A illustrates an isometric view of a transferred batwing intensity distribution three-dimensional polar chart for the embodiment of FIG. 6A having microstructures with roof angles of 90 degrees.
Figure 7B:
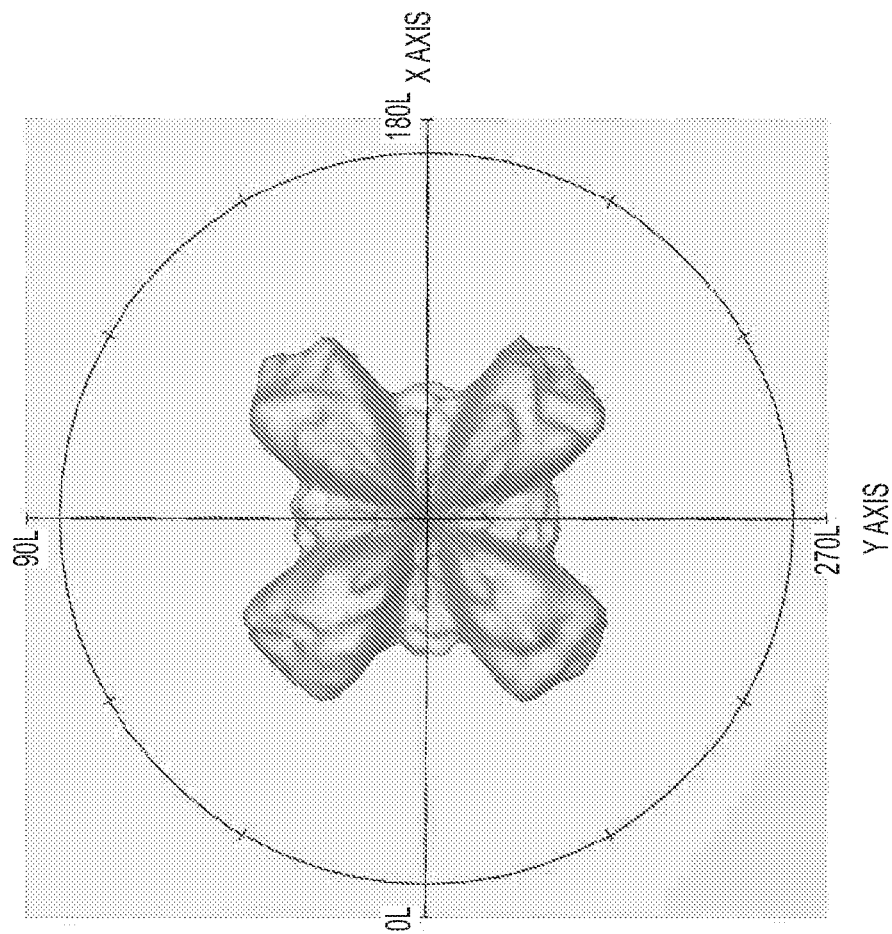
FIG. 7B illustrates a top view of the three-dimensional polar chart of FIG. 7A.
Figure 7C:
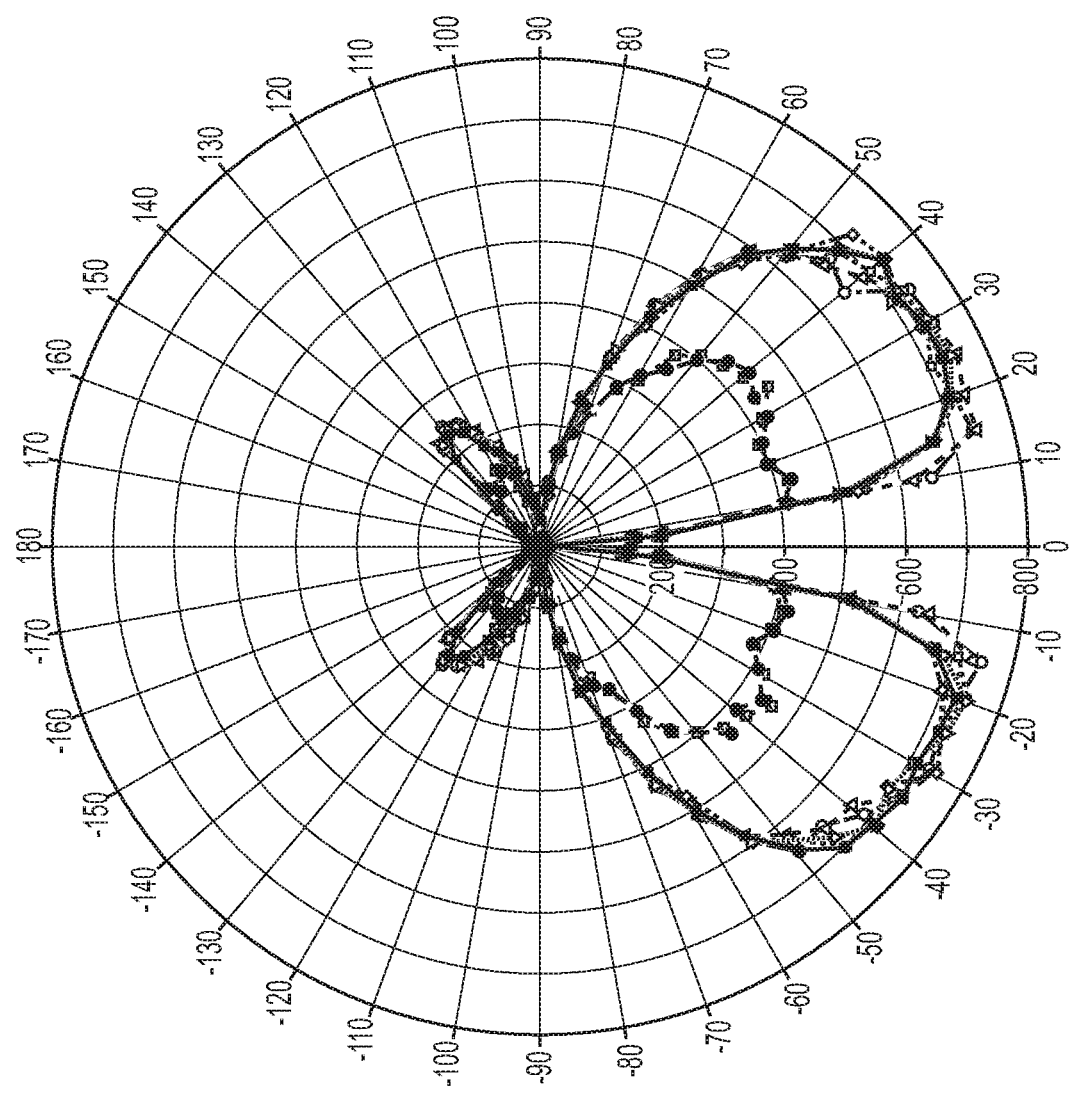
FIG. 7C illustrates a two-dimensional polar chart of the transferred batwing intensity distribution for the embodiment of FIG. 6A with the microstructures having a refractive index of 1.5 and roof angles of 90 degrees.

A representation of the three dimensional transformation of the light distribution provided by the substrate 600 having a refractive index of 1.5 is shown in FIGS. 7A and 7B. In this embodiment, light energy is not only steered away from the 0 degree emitting direction, but also pushed toward four directions approximately 45 degrees from the primary X and Y axes as shown. Along those directions, light typically travels the longest path length reaching the target area where stronger intensity is desired. FIG. 7C is a 2D polar plot of the light intensity distributions represented by FIGS. 7A and 7B.

Figure 7D:
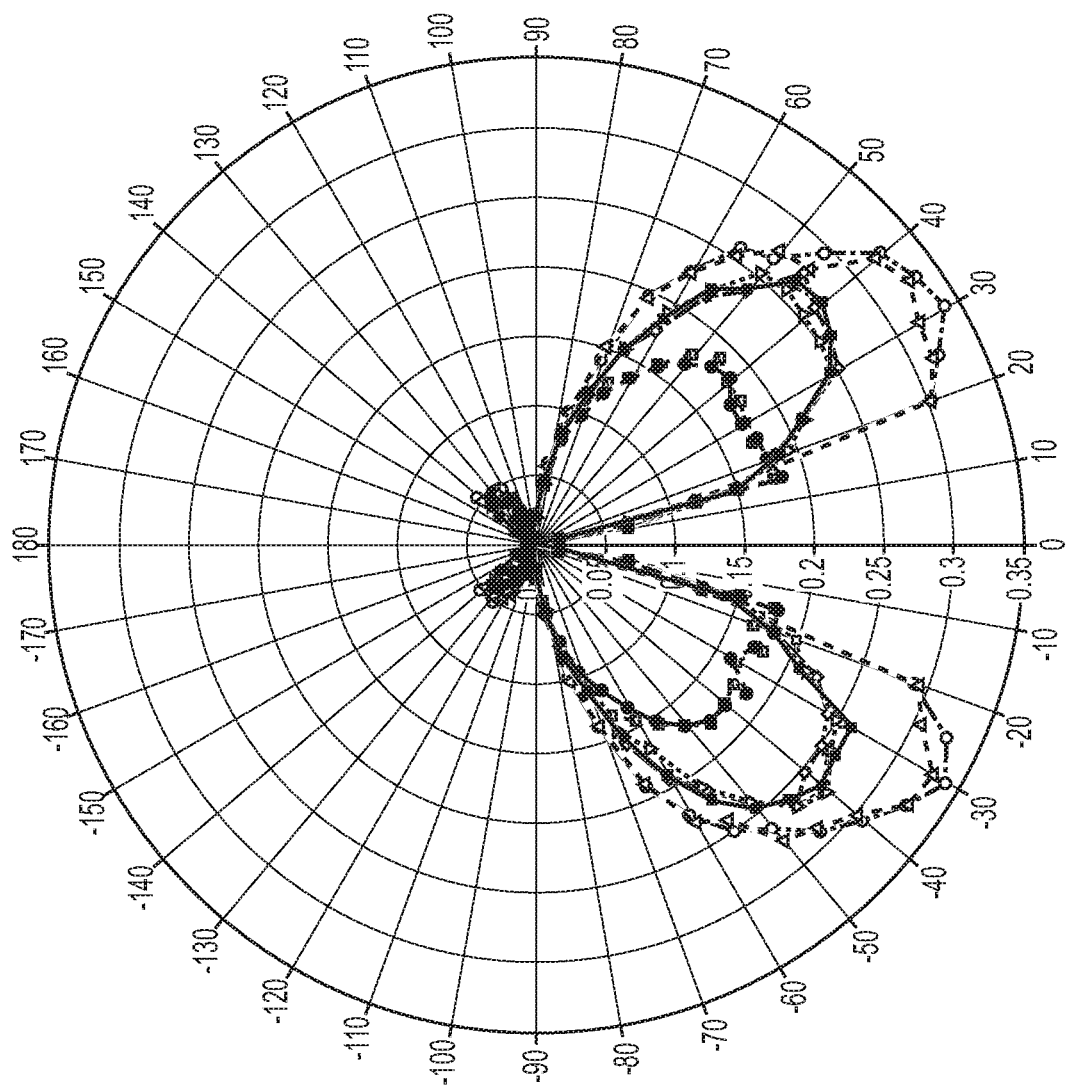
FIG. 7D illustrates a two-dimensional polar chart of the transferred batwing intensity distribution for the embodiment of FIG. 6A with the microstructures a refractive index of 1.6 and roof angles of 90 degrees.
Figure 7E:
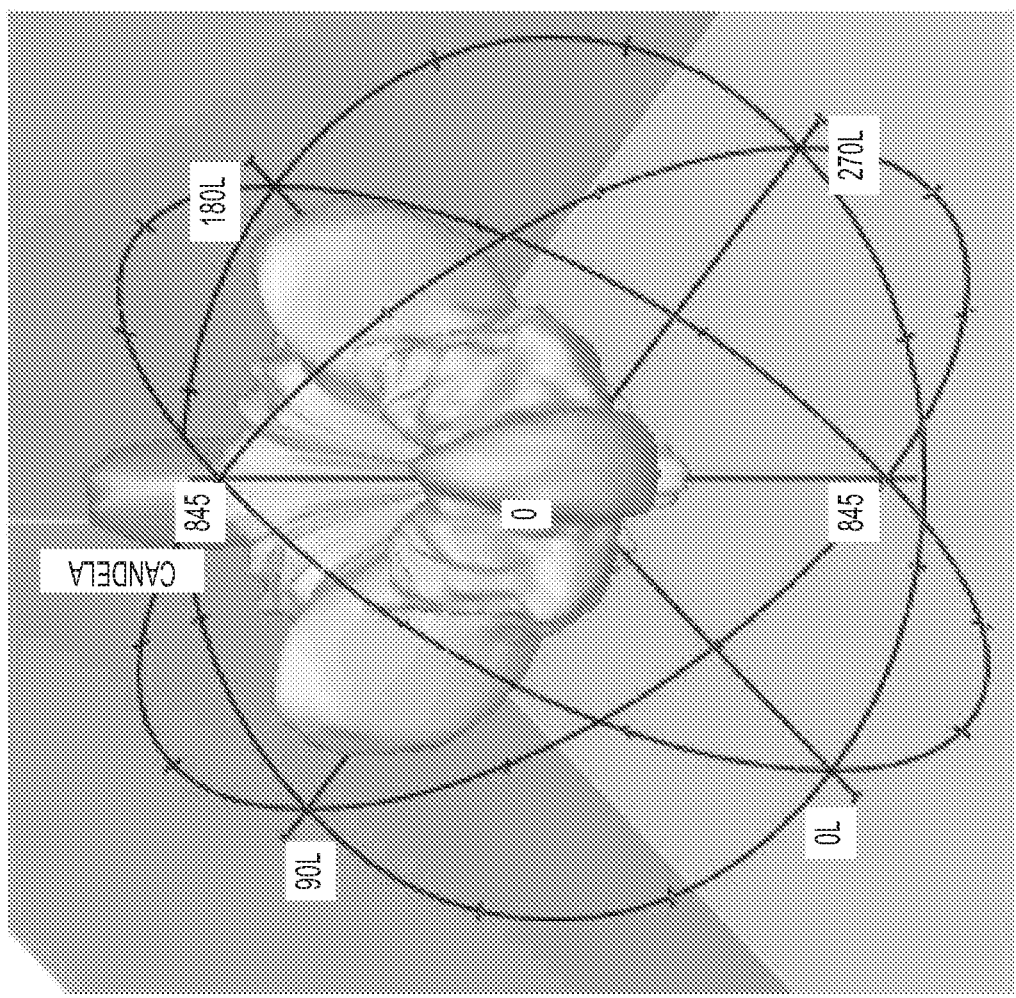
FIG. 7E illustrates an isometric view of a transferred batwing intensity distribution three-dimensional polar chart for the embodiment of FIG. 6A having microstructures with roof angles of 80 degrees.
Figure 7F:
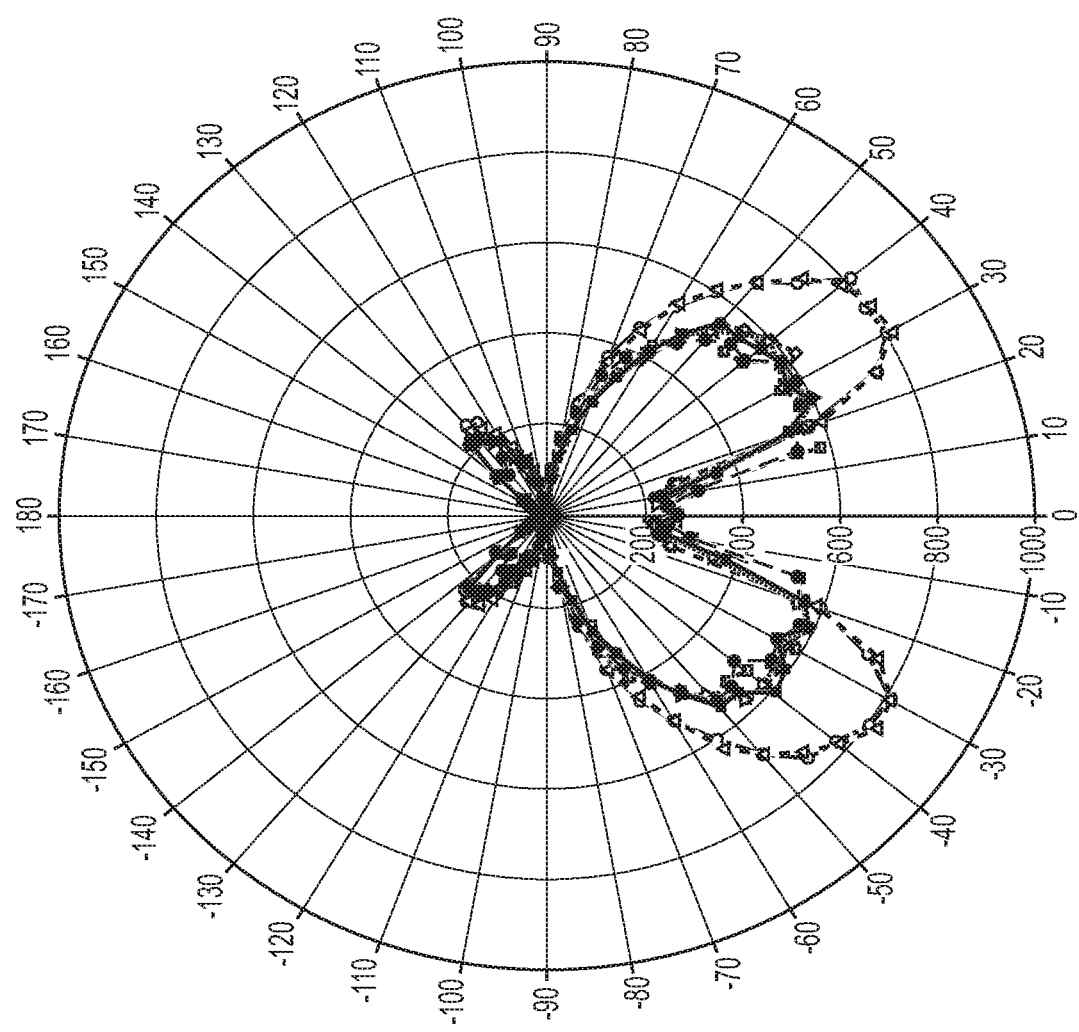
FIG. 7F illustrates a two-dimensional polar chart of the transferred batwing intensity distribution for the embodiment of FIG. 6A having microstructures with roof angles of 80 degrees.
Figure 7G:
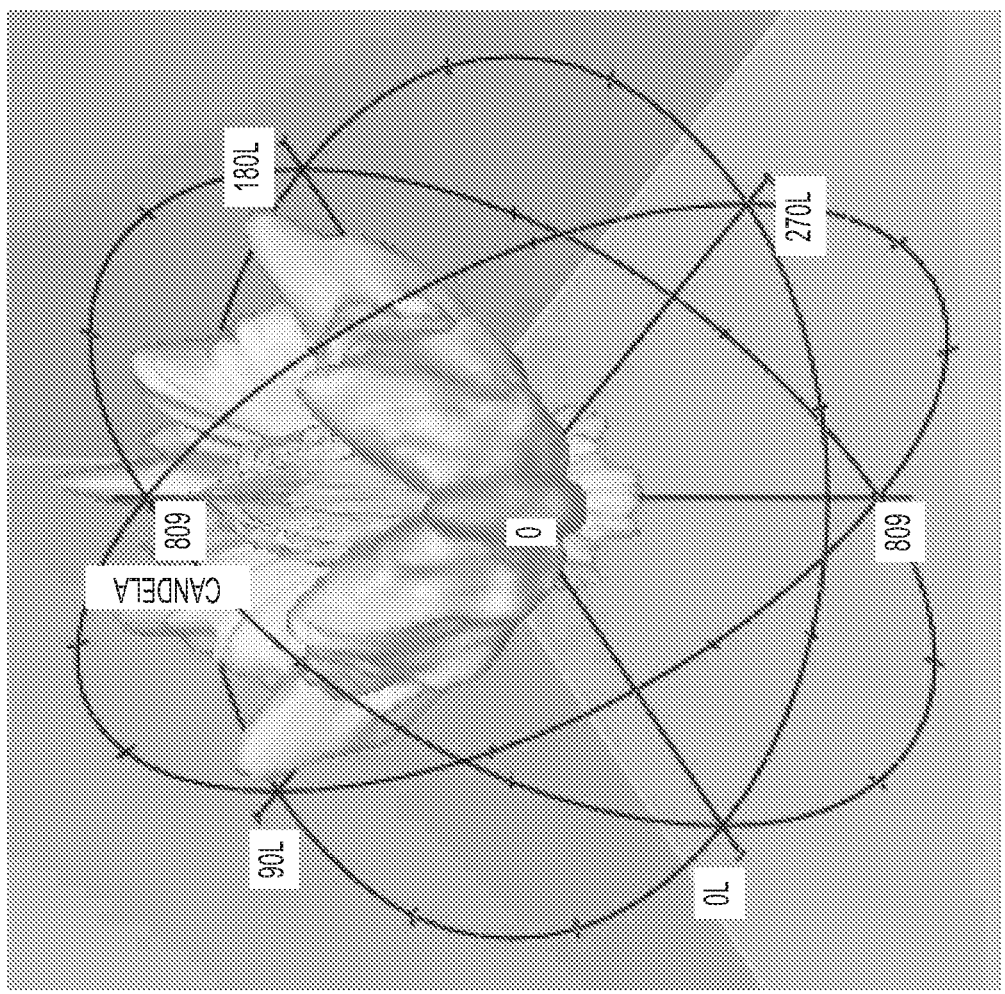
FIG. 7G illustrates an isometric view of a transferred batwing intensity distribution three-dimensional polar chart for the embodiment of FIG. 6A having microstructures with roof angles of 70 degrees.
Figure 7H:
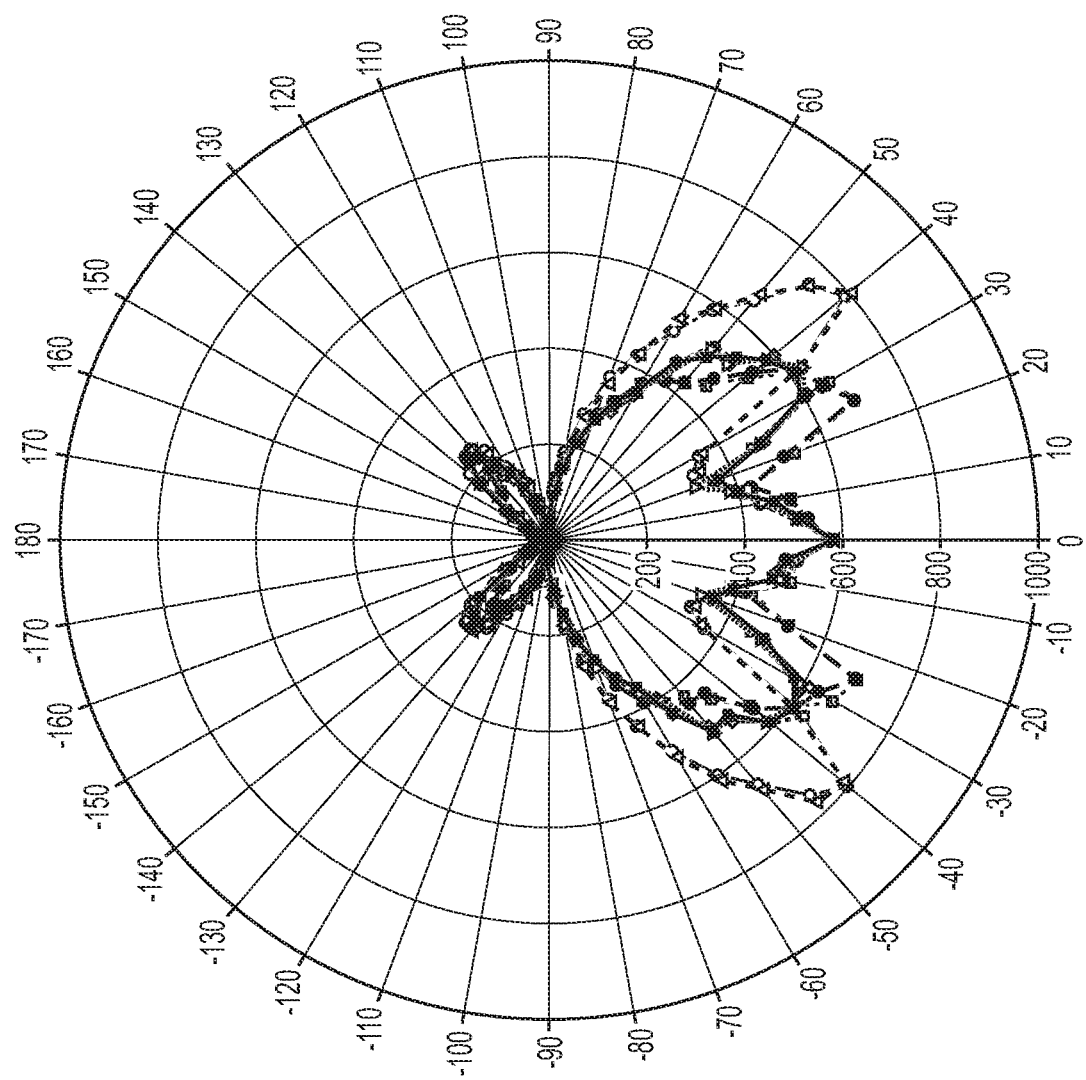
FIG. 7H illustrates a two-dimensional polar chart of the transferred batwing intensity distribution for the embodiment of FIG. 6A having microstructures with roof angles of 70 degrees.
Figure 7I:
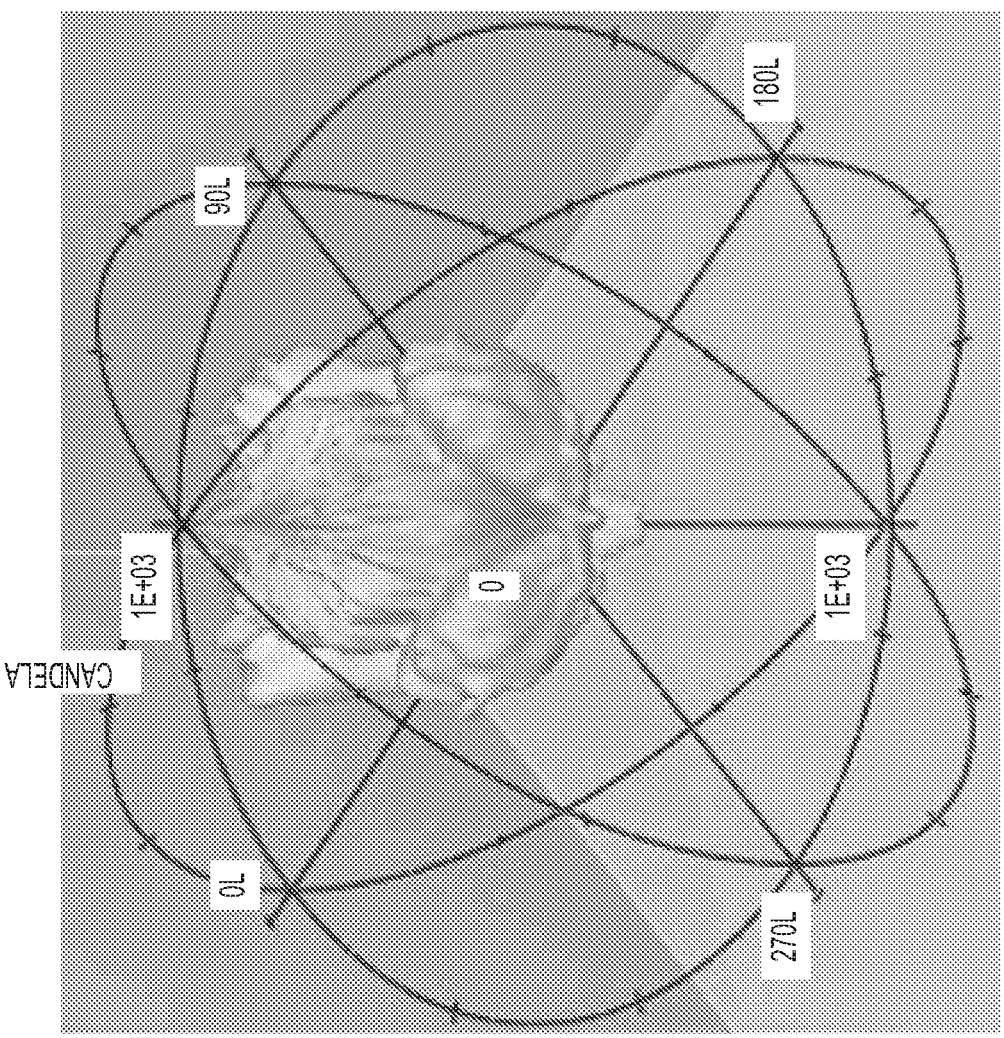
FIG. 7I illustrates an isometric view of a transferred batwing intensity distribution three-dimensional polar chart for the embodiment of FIG. 6A having microstructures with roof angles of 60 degrees.
Figure 7J:
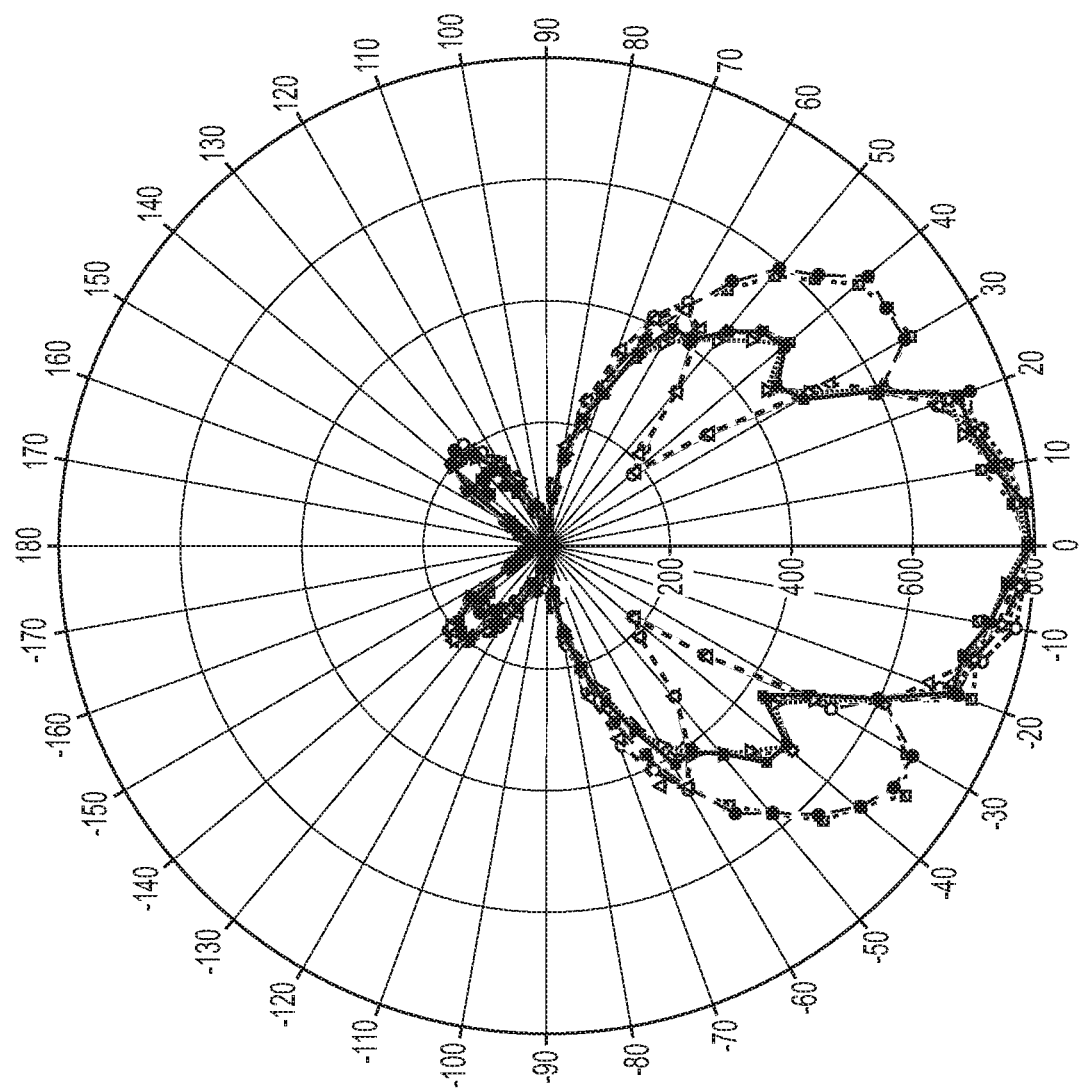
FIG. 7J illustrates a two-dimensional polar chart of the transferred batwing intensity distribution for the embodiment of FIG. 6A having microstructures with roof angles of 60 degrees.
Figure 7K:
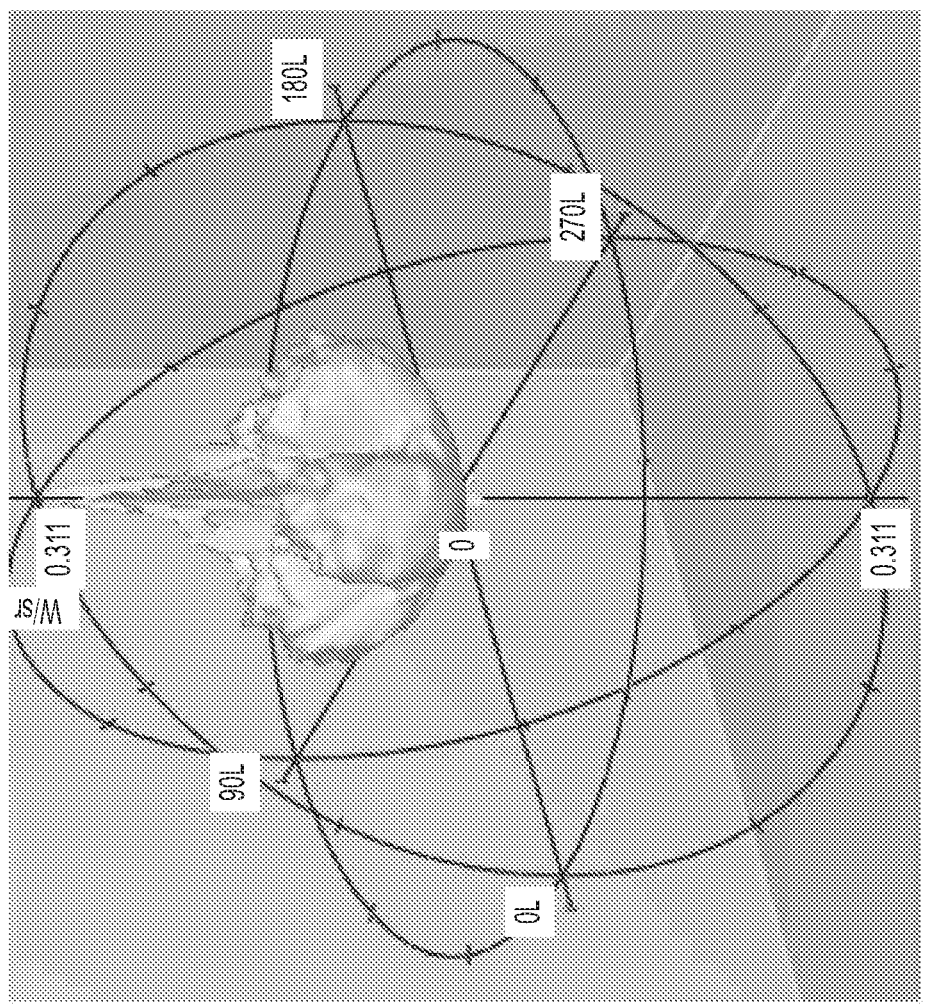
FIG. 7K illustrates an isometric view of a transferred batwing intensity distribution three-dimensional polar chart for the embodiment of FIG. 6A having microstructures with roof angles of 100 degrees.
Figure 7L:
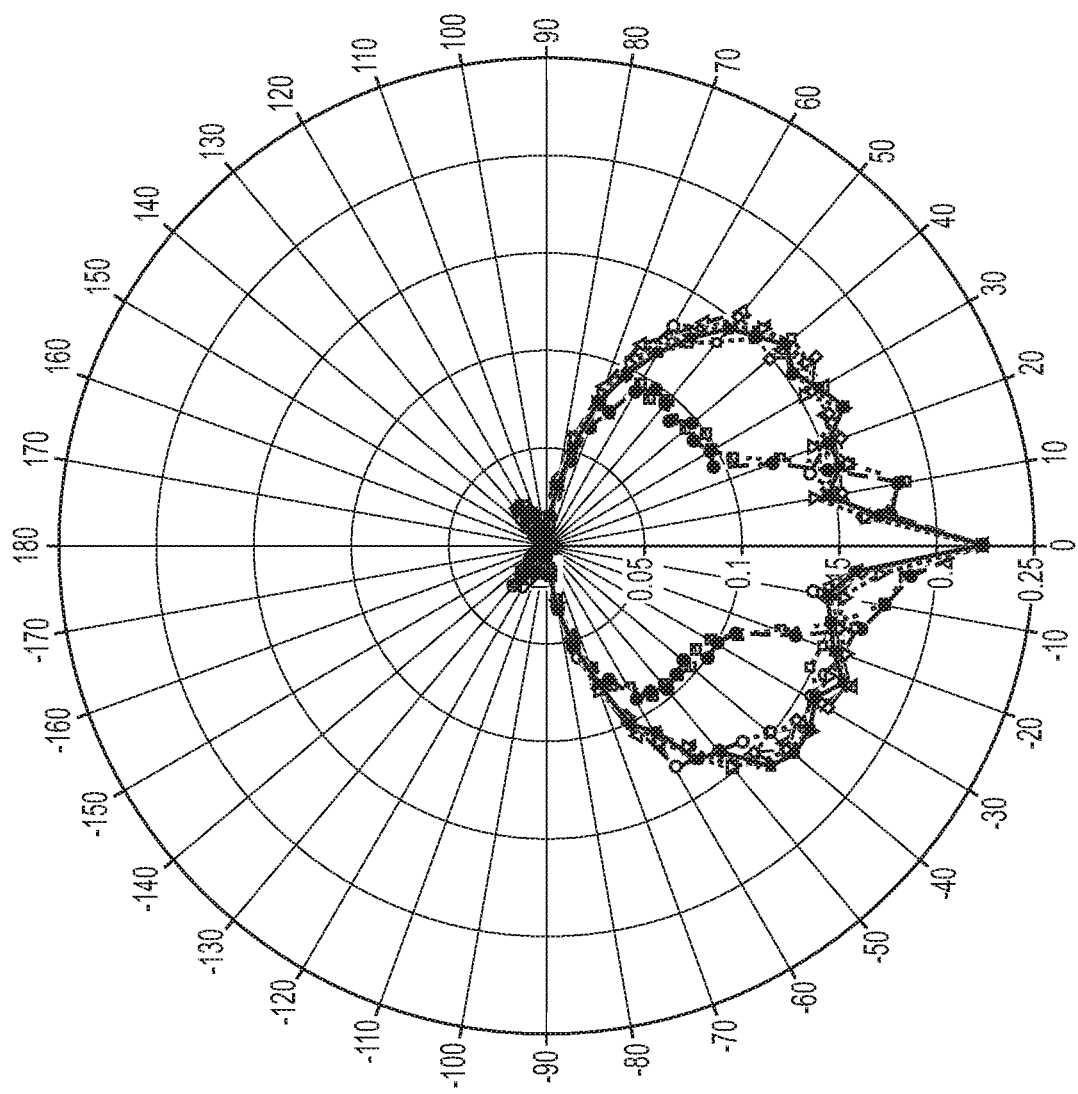
FIG. 7L illustrates a two-dimensional polar chart of the transferred batwing intensity distribution for the embodiment of FIG. 6A having microstructures with roof angles of 100 degrees.

FIG. 7D is a 2D polar plot of a representation of the light intensity distribution provided by the substrate 600 having a refractive index of 1.6 with the micro-pyramids having a roof angle α of 90 degrees. A comparison of FIGS. 7C and 7D shows the influence the refractive index has on the batwing spreading performance of the substrate 600.

The roof angle α of the micro-pyramids 612 affects the light distribution provided by the substrate 600 having a refractive index of 1.5, as illustrated by FIGS. 7A-7C and 7E-7L. As illustrated, roof angles α of 80 degrees (represented by FIGS. 7E and 7F) and 70 degrees (represented by FIGS. 7G and 7H) as compared to 90 degrees (represented by FIGS. 7A-7C) provide different zero degree light intensities as well as shapes of the batwing distribution. Roof angles α of 60 degrees (represented by FIGS. 7I and 7J) and 100 degrees (represented by FIGS. 7K and 7L) provide different zero degree light intensities, but do not provide batwing distributions. According to embodiments of the invention, the roof angle α of the micro-pyramids 612 is in the range of 70 degrees to 95 degrees for substrates having a refractive index of 1.5.

FIG. 8A illustrates a light transmissive substrate 800 that has an array of microstructures 812 on a first surface 810 thereof. In this embodiment, the microstructures 812 are in the form of an array of hybrid micro-pyramids that are placed above an LED light source 830 that outputs light in a Lambertian distribution. As illustrated in FIG. 8A, the light enters the substrate 800 via the first surface 810 having the array of hybrid micro-pyramids 812 and exits a second surface 820 on an opposite side of the substrate 800 as the first surface 810. FIGS. 8B and 8C illustrate the hybrid micro-pyramid 812 in further detail. As illustrated, a top portion 814 of the hybrid micro-pyramid 812 may have a roof angle α (see FIG. 3) of 85 degrees, and a bottom portion (frustum) 816 of the hybrid micro-pyramid 812 may have a roof angle α of 70 degrees. In embodiments in which the roof angle α of the bottom portion 816 is 70 degrees, sides 818 of the bottom portion 816 are each disposed at an angle β (see FIG. 3) of 55 degrees. In an embodiment, the top portion 814 may have a roof angle α of between 85 degrees and 90 degrees.

Figure 9A:
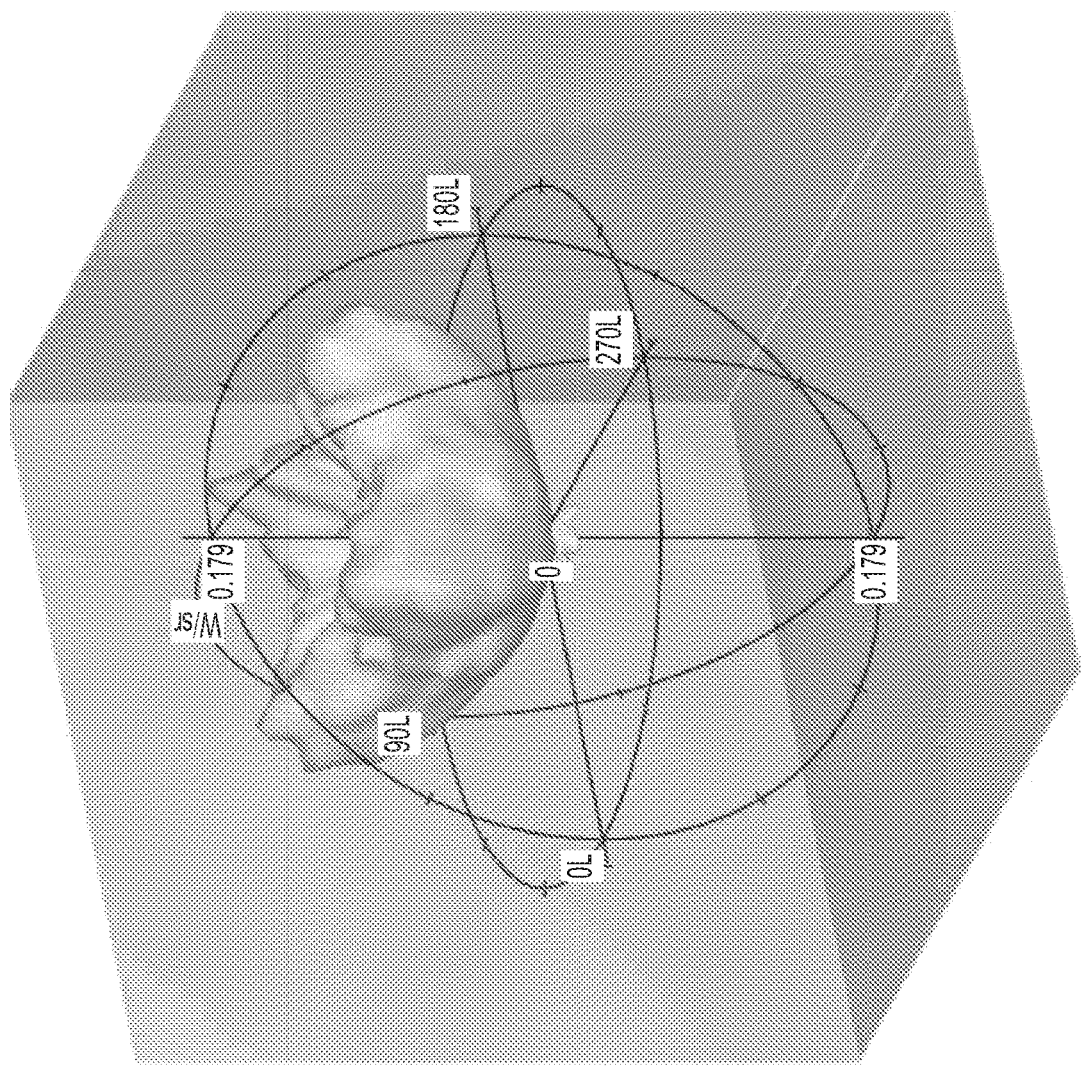
FIG. 9A is an isometric view of a transferred batwing intensity distribution three-dimensional polar chart for the embodiment of FIG. 8A.
Figure 9B:
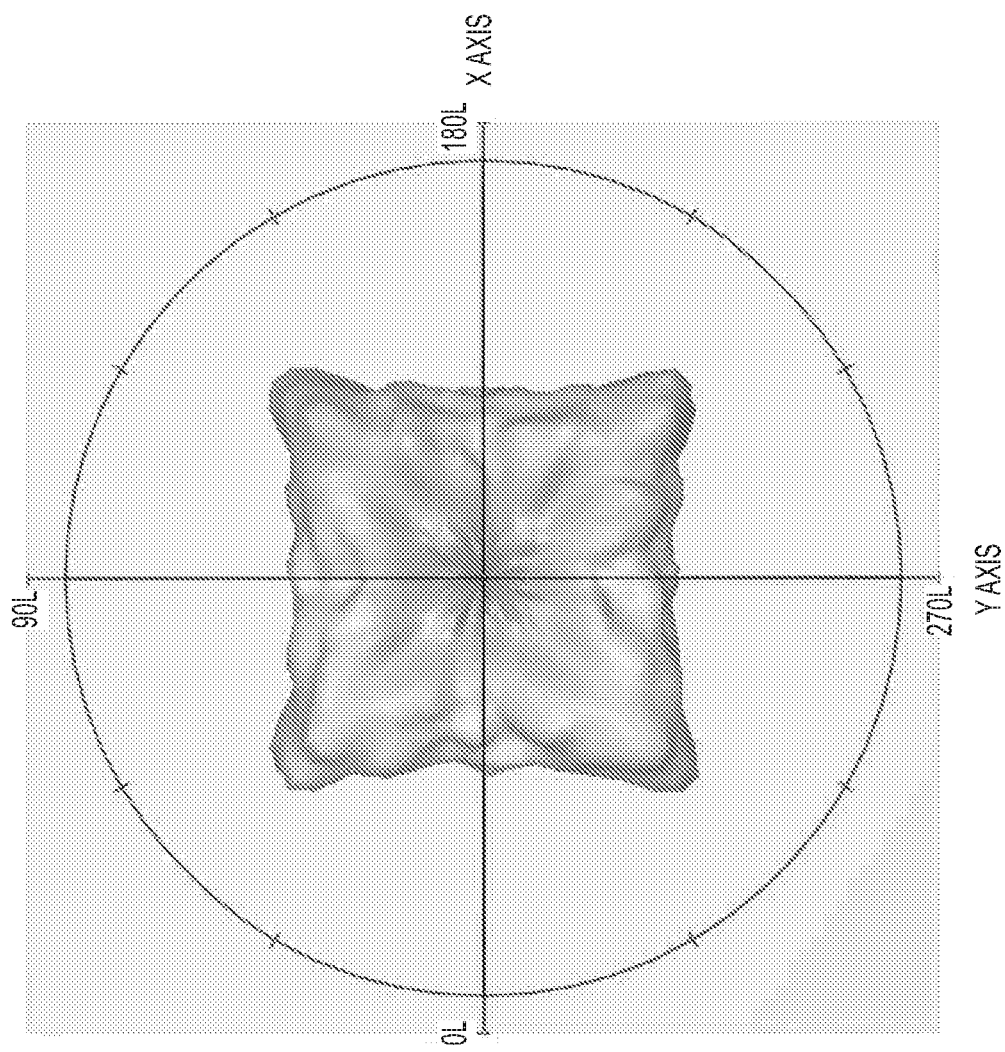
FIG. 9B is a top view of the three-dimensional polar chart of FIG. 9A.

A representation of the three dimensional transformation of the light distribution provided by the substrate 800 having a refractive index of 1.5 is shown in FIGS. 9A and 9B. As illustrated, the hybrid micro-pyramid may provide enhanced performance when compared to a "simple" pyramid, such as the pyramid 612 described above. In this embodiment, light energy is not only steered farther away from the 0 degree emitting direction, but also pushed toward four directions approximately 45 degrees from the primary X and Y axes as shown. Along those directions, light typically travels the longest path length reaching the target area where stronger intensity is desired. FIG. 9C is a 2D polar plot of the light intensity distributions represented by FIGS. 9A and 9B.

Figure 9D:
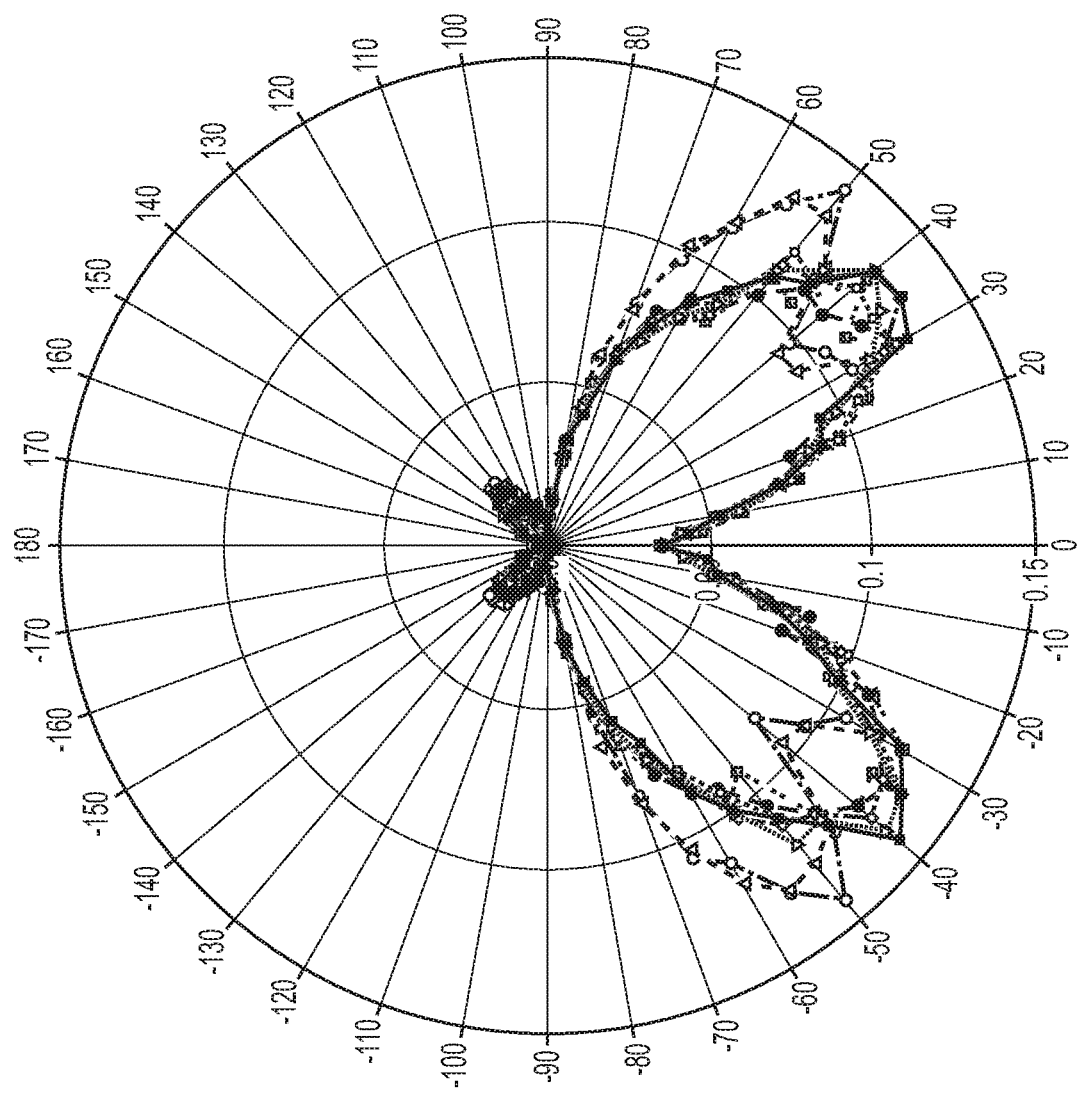
FIG. 9D illustrates a two-dimensional polar chart of the transferred batwing intensity distribution for the embodiment of FIG. 8A with the microstructures having a refractive index of 1.6.

FIG. 9D is a 2D polar plot of a representation of the light intensity distribution provided by the substrate 800 having a refractive index of 1.6 with the hybrid micro-pyramids 812 having the top portion 814 with a roof angle α (see FIG. 3) of 85 degrees, and the bottom portion 816 with a roof angle α of 70 degrees. A comparison of FIGS. 9C and 9D shows the influence the refractive index has on the batwing spreading performance of the substrate 600.

Figure 10:
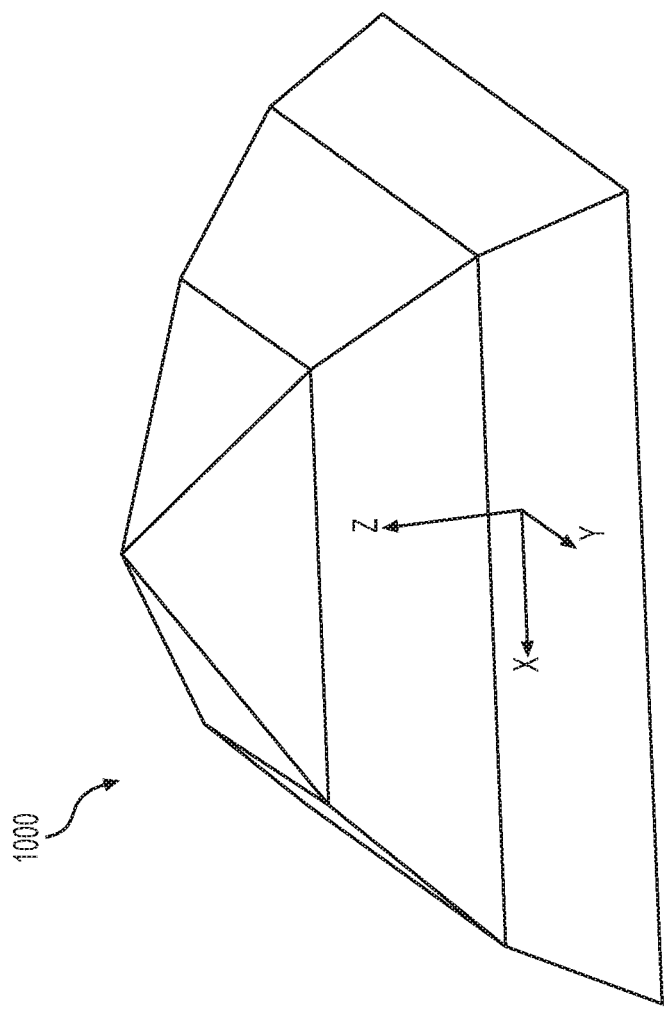
FIG. 10 is an isometric schematic view of a microstructure in accordance with an embodiment of the invention.
Figure 11:
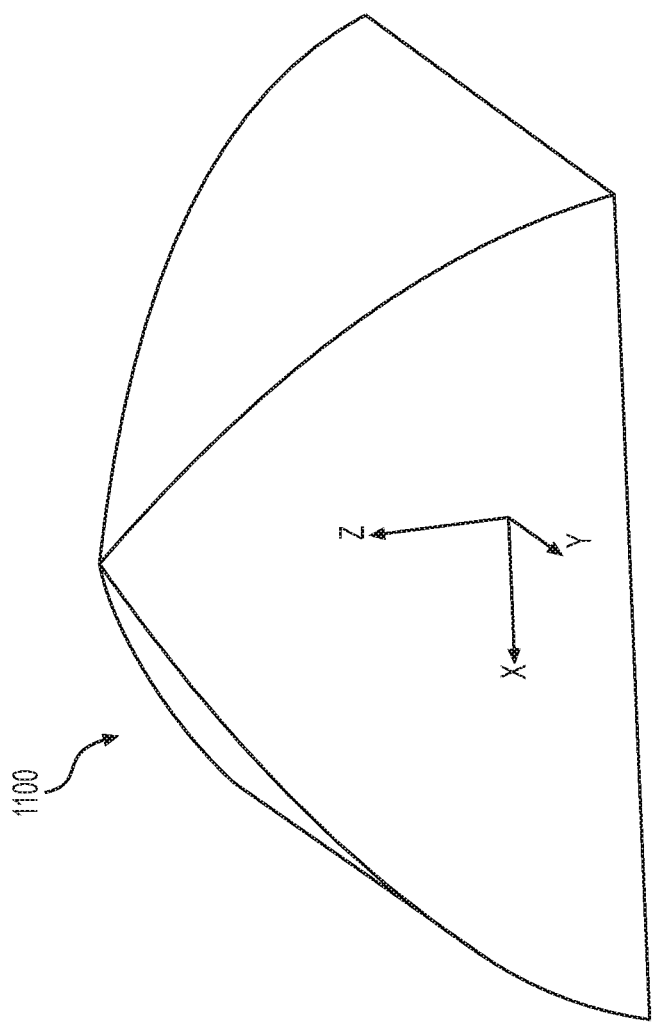
FIG. 11 is an isometric schematic view of a microstructure in accordance with an embodiment of the invention.

Pyramid roof angles α for the top portion 814 and the bottom portion 816 may be adjusted to optimize the output distribution. Textures may be added to the second surface 820 of the substrate 800 to fine tune the distribution profile and to enhance the optical transmission efficiencies. Although FIGS. 9A-9C illustrate a hybrid pyramid that has two portions and sharp edges and transitions between the two portions, it is contemplated that the hybrid pyramid may have more than two portions and/or facets of the hybrid pyramid may be curved, thereby adding flexibilities for further transformation fine tuning and performance optimizations. For example, FIG. 10 illustrates a three-section hybrid micro-pyramid 1000 that may be used for the microstructure 812 of FIG. 8A, and FIG. 11 illustrates a curved-facet hybrid micro-pyramid 1100 that may be used for the microstructure 812 of FIG. 8A.

Figure 12A:
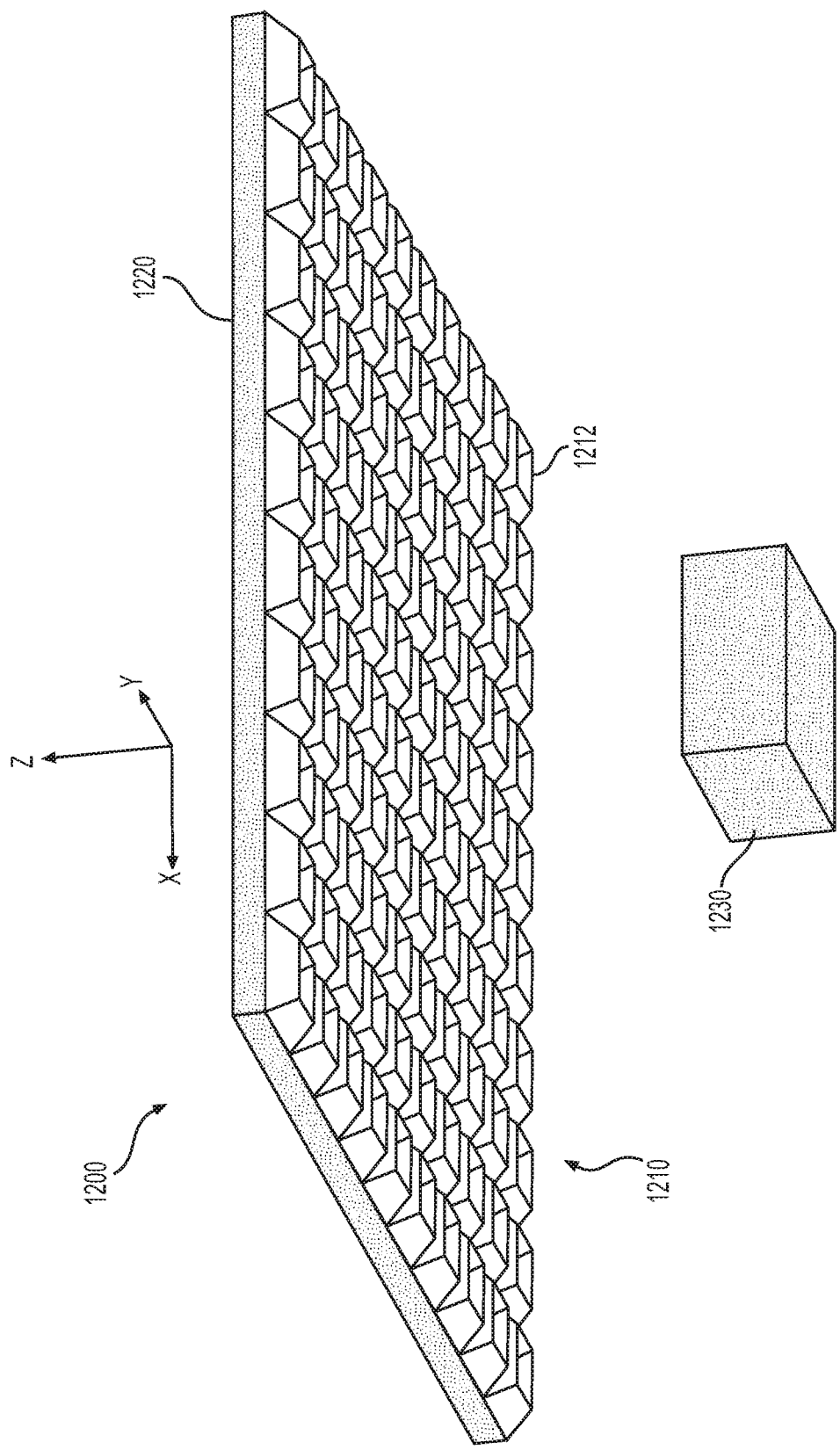
FIG. 12A illustrates an LED light source and a single light transmissive substrate with microstructures in accordance with an embodiment of the invention.
Figure 12B:
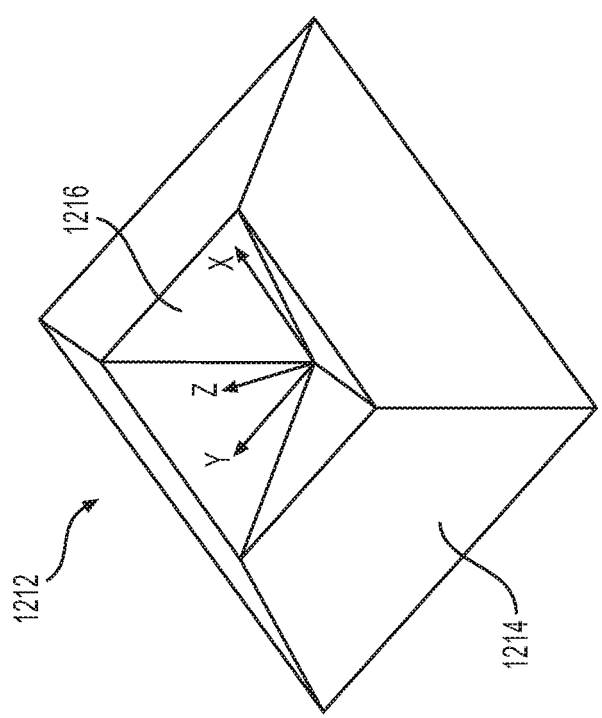
FIG. 12B illustrates a single microstructure of FIG. 12A.

FIG. 12A illustrates a light transmissive substrate 1200 that has an array of microstructures 1212 on a first surface 1210 thereof. In this embodiment, the microstructures 1212 are in the form of an array of "folded" micro-pyramids that are placed above an LED light source 1230 that outputs light in a Lambertian distribution. As illustrated in FIG. 12A, the light enters the substrate 1200 via the first surface 1210 having the array of folded micro-pyramids 1212 and exits a second surface 1220 on an opposite side of the substrate 1200 as the first surface 1210. FIG. 12B illustrates the folded micro-pyramid 1212 in further detail. As illustrated, the folded micro-pyramid has a frustum or base section 1214 and a recess 1216 having the shape of a micro-pyramid in the base section 1214, thereby giving the pyramid a configuration that looks as though the tip of a simple pyramid was pressed downward and into the base section 1214 or "folded" into the base section 1214. Both the base section 1214 and the recess 1216 may have roof angles α (see FIG. 3) of 90 degrees.

Folded pyramids may enhance the manufacturability of the light transmissive substrate to overcome a restriction on the height of the microstructures in the Z-direction (represented by 'h' in FIG. 3) for many microstructure fabrication processes. Folded pyramids also offer possibilities of achieving functionalities of structures of larger heights (h in FIG. 3) than the fabrication process may allow. In an embodiment, the height h of the microstructures may be in the range of about 10 micrometers to about 50 micrometers. Pyramid roof angles may be adjusted to optimize the output distribution. Textures may be added to the second surface 1220 of the substrate 1200 to fine tune the distribution profile and to enhance the optical transmission efficiencies.

Figure 13A:
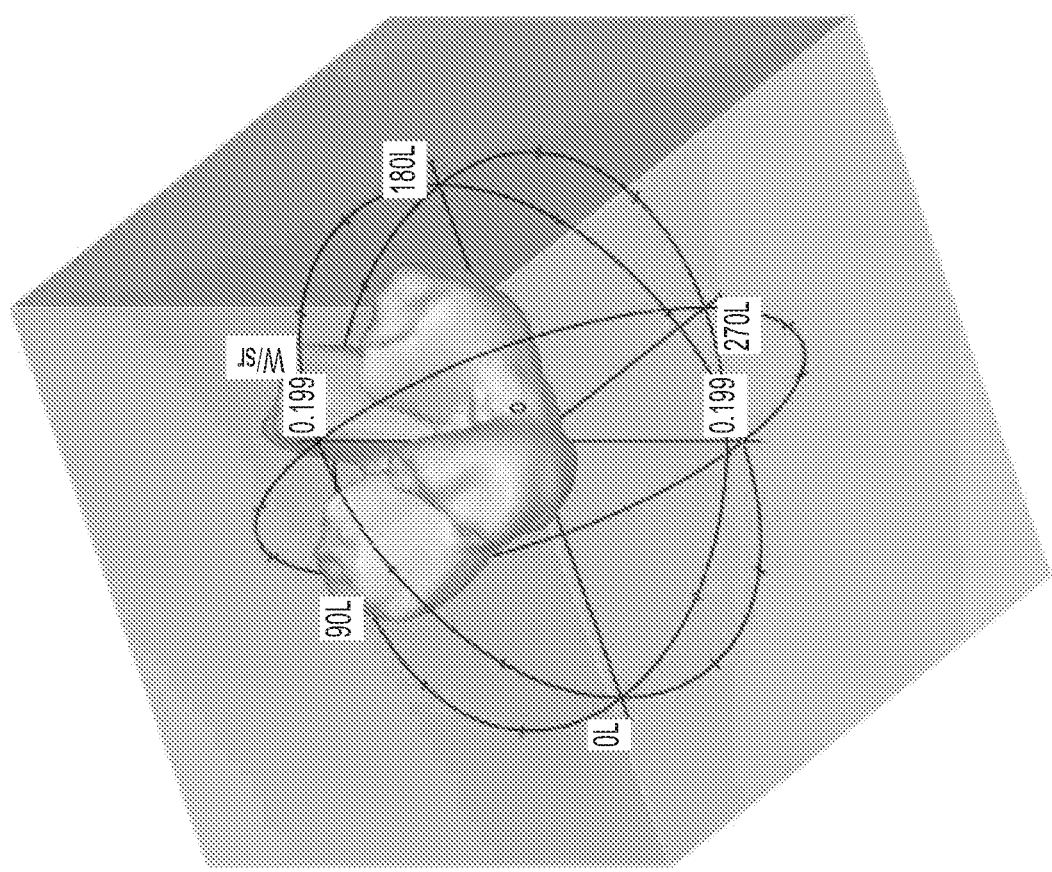
FIG. 13A illustrates an isometric view of a transferred batwing intensity distribution three-dimensional polar chart for the embodiment of FIG. 12A.
Figure 13B:
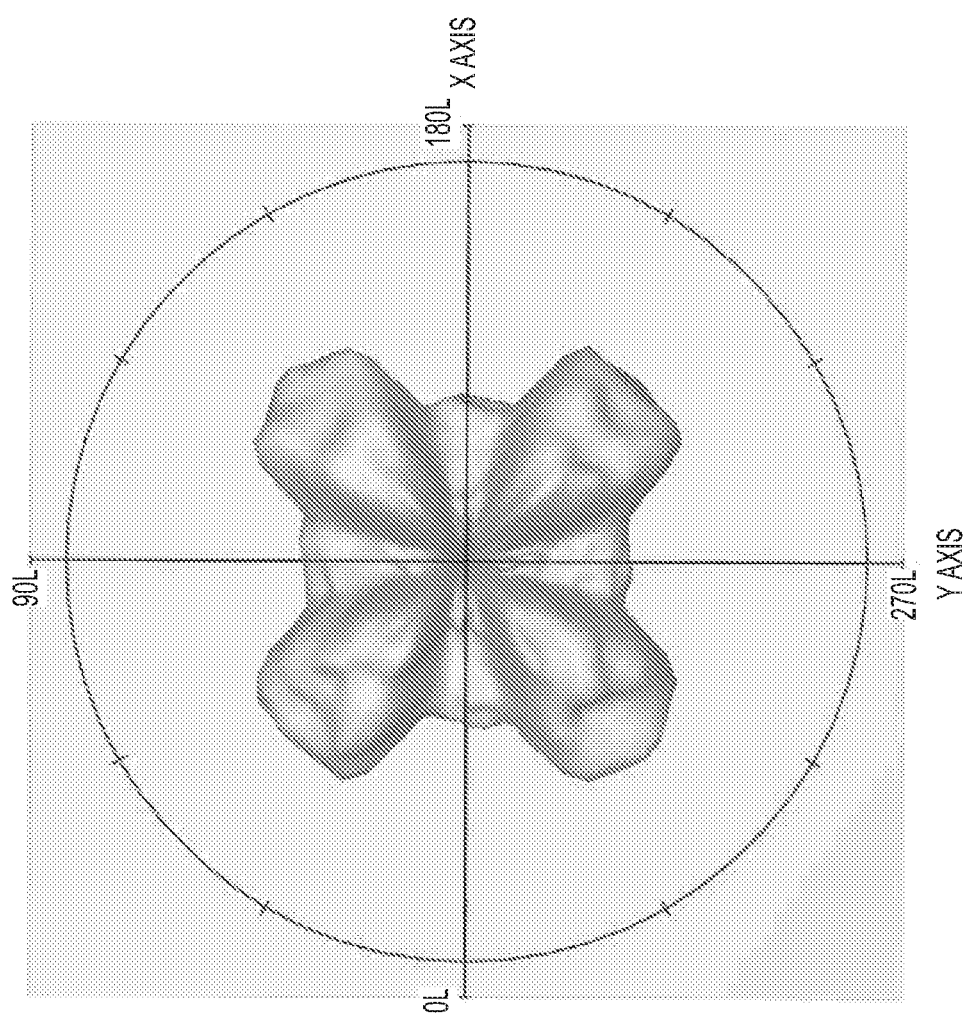
FIG. 13B illustrates a top view of the three-dimensional polar chart of FIG. 13A.
Figure 13C:
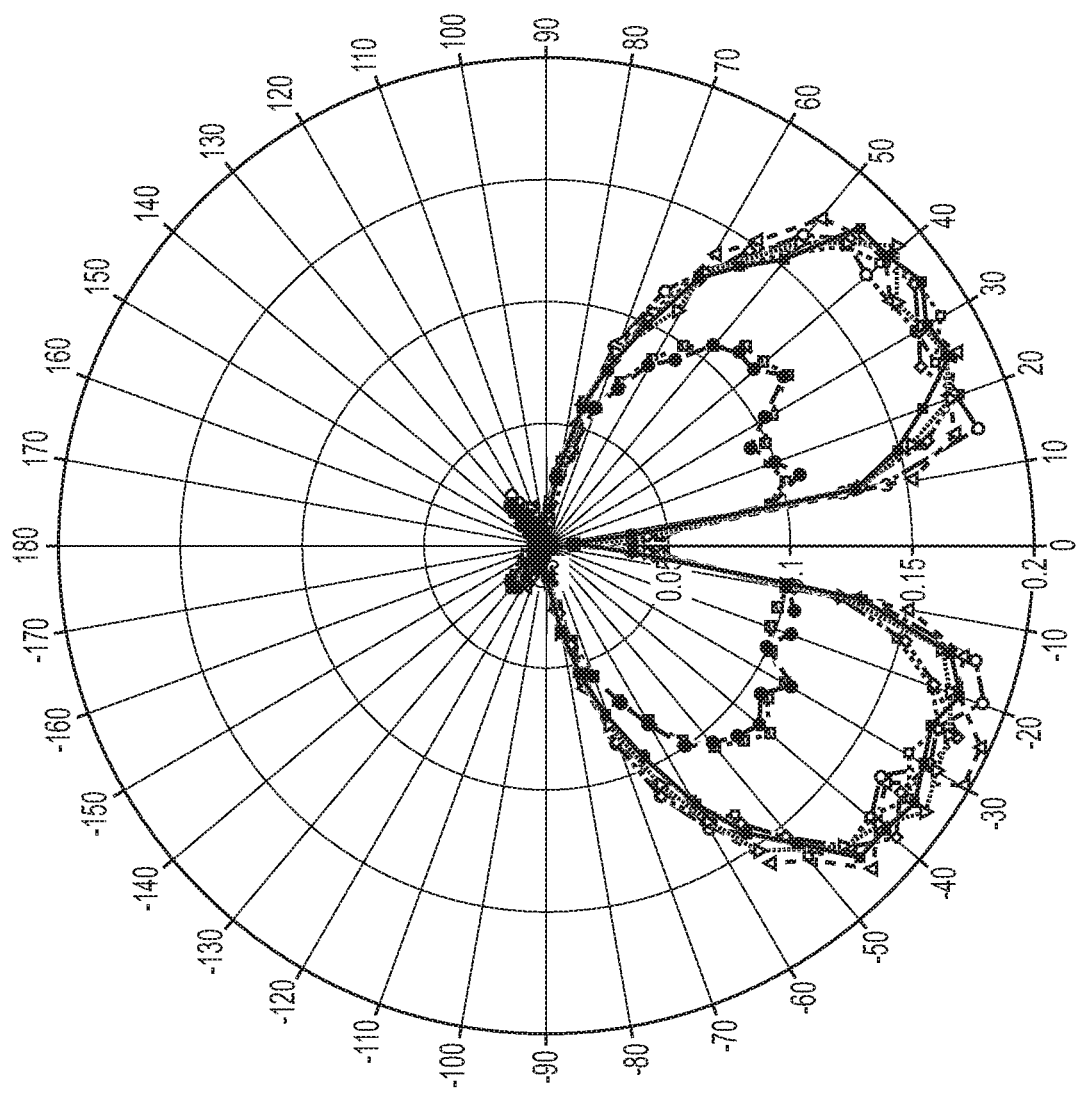
FIG. 13C illustrates a two-dimensional polar chart of the transferred batwing intensity distribution for the embodiment of FIG. 12A.

A representation of the three dimensional transformation of the light distribution provided by the substrate 1200 is shown in FIGS. 13A and 13B. In this embodiment, light energy is not only steered away from the 0 degree emitting direction, but also pushed toward four directions approximately 45 degrees from the primary X and Y axes as shown. Along those directions, light typically travels the longest path length reaching the target area where stronger intensity is desired. FIG. 13C is a 2D polar plot of the light intensity distributions represented by FIGS. 13A and 13B.

Figure 14A:
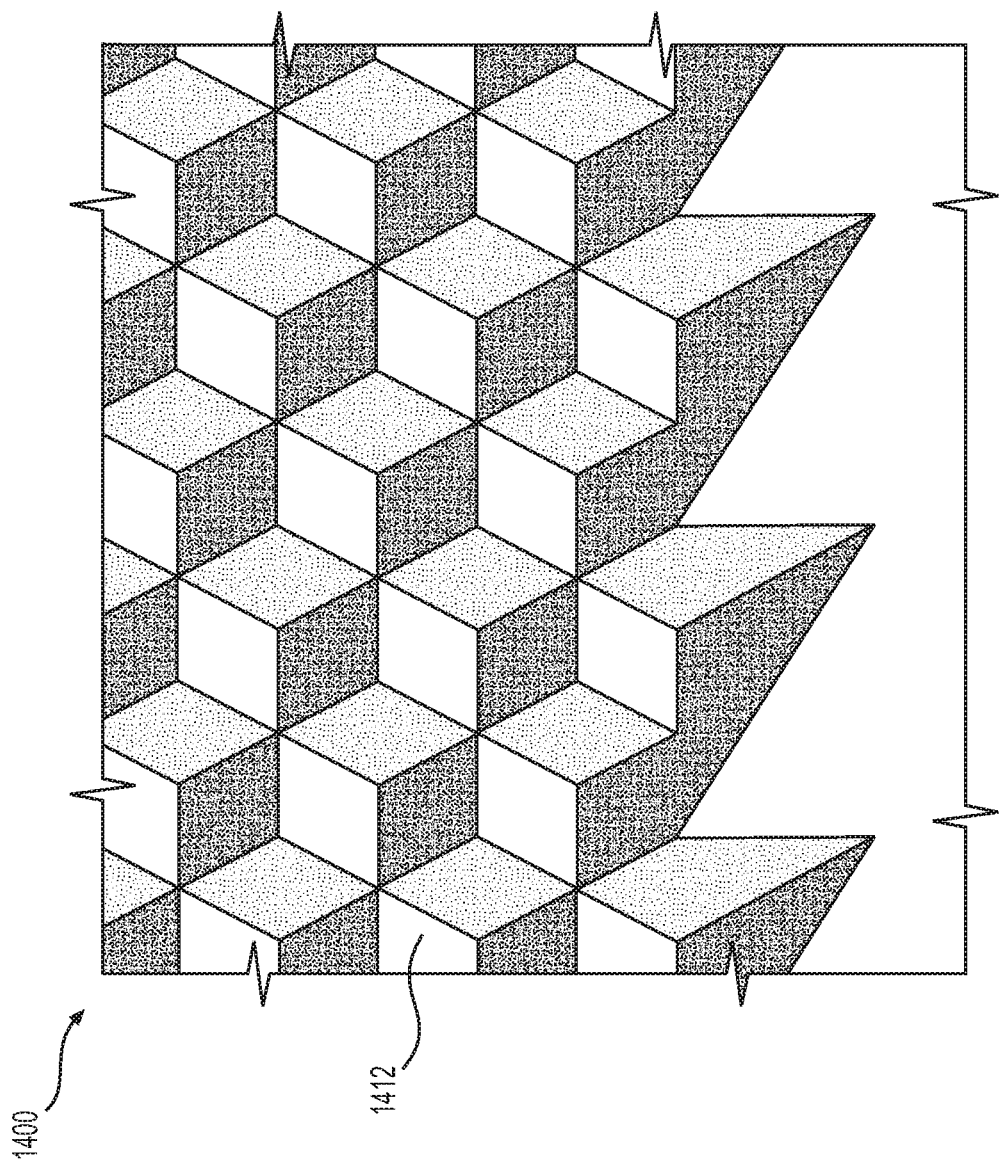
FIG. 14A illustrates an isometric view of a light transmissive substrate with microstructures in accordance with an embodiment of the invention.
Figure 14B:
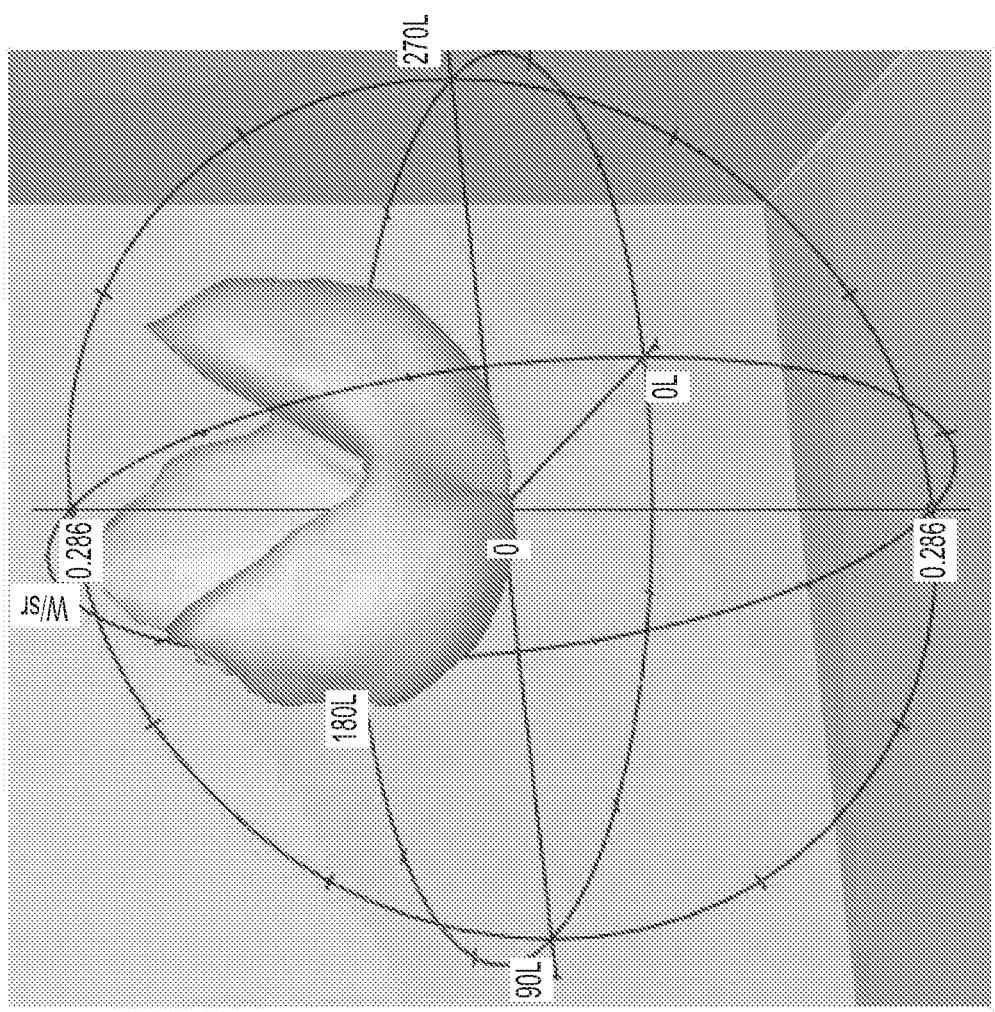
FIG. 14B illustrates an isometric view of a transferred batwing intensity distribution three-dimensional polar chart for the embodiment of FIG. 14A.
Figure 14C:
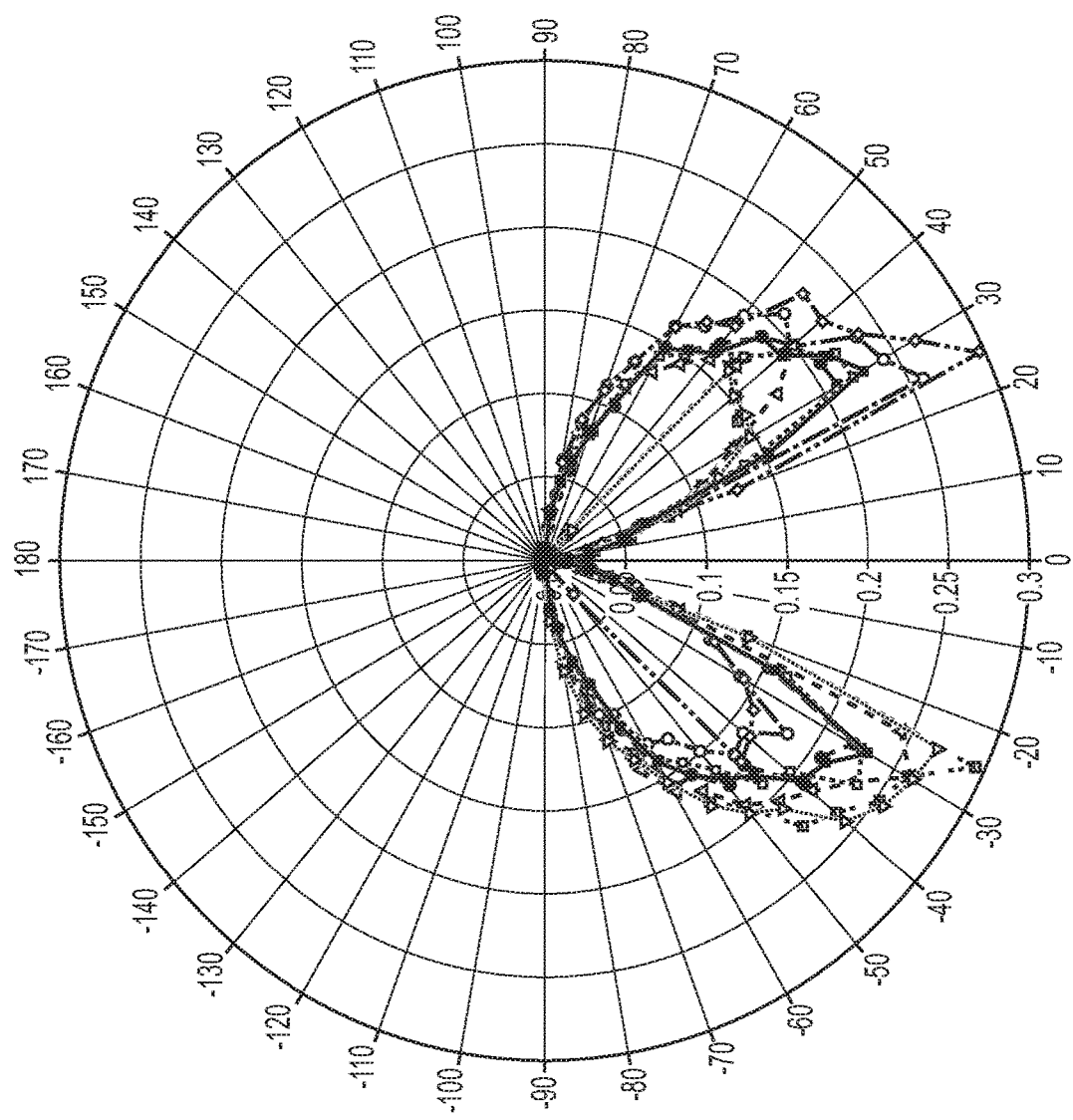
FIG. 14C illustrates a two-dimensional polar chart of the transferred batwing intensity distribution for the embodiment of FIG. 14A.

FIG. 14A illustrates an embodiment of a light transmissive substrate 1400 with an array of microstructures 1412 in the form of corner cubes having square shaped faces that may be used in place of the light transmissive substrates described above. A representation of the three dimensional transformation of the light distribution provided by the substrate having a refractive index of 1.5 and the microstructures 1412 is shown in FIG. 14B. FIG. 14C is a 2D polar plot of the light intensity distribution represented by FIG. 14B.

Figure 15A:
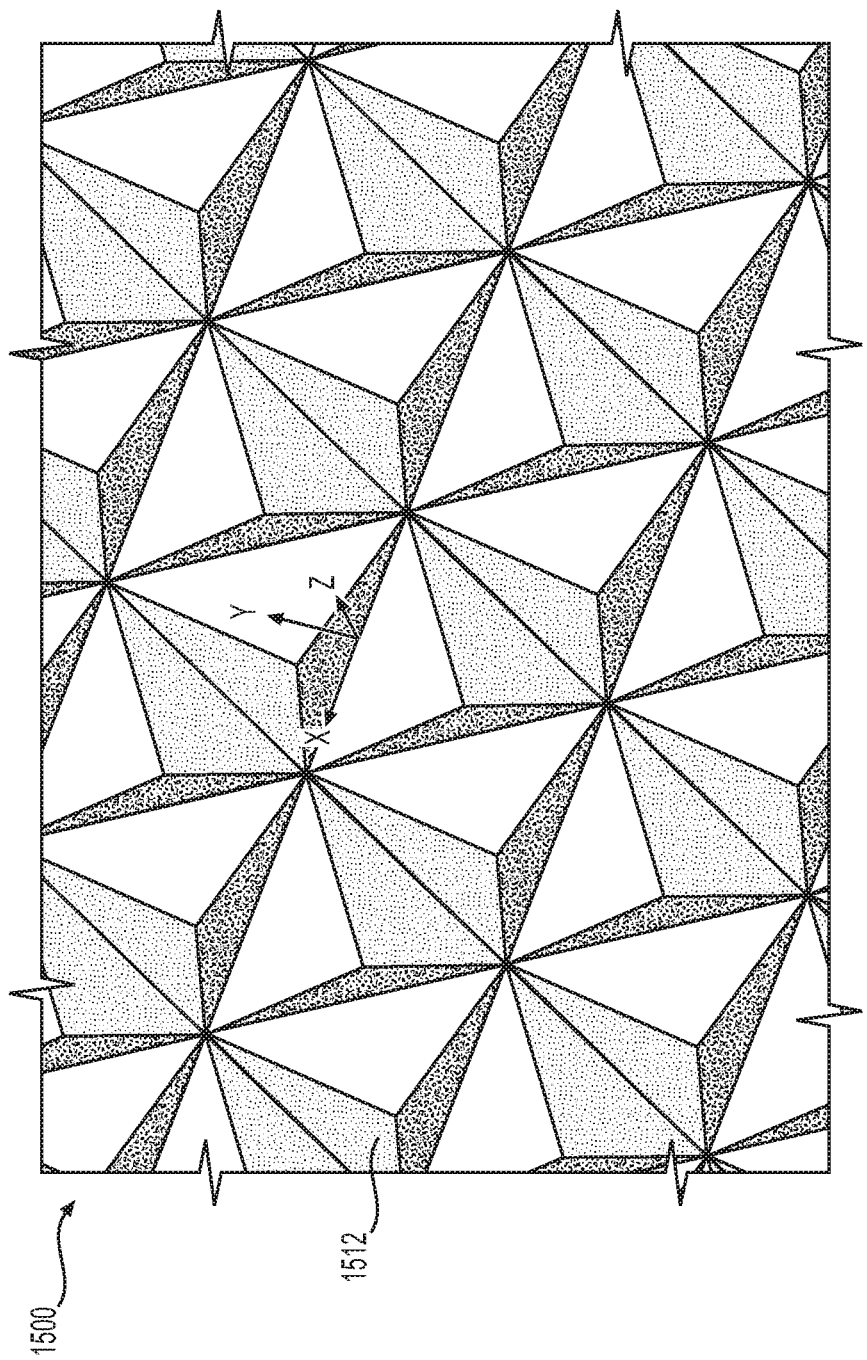
FIG. 15A illustrates an isometric view of a light transmissive substrate with microstructures in accordance with an embodiment of the invention.
Figure 15B:
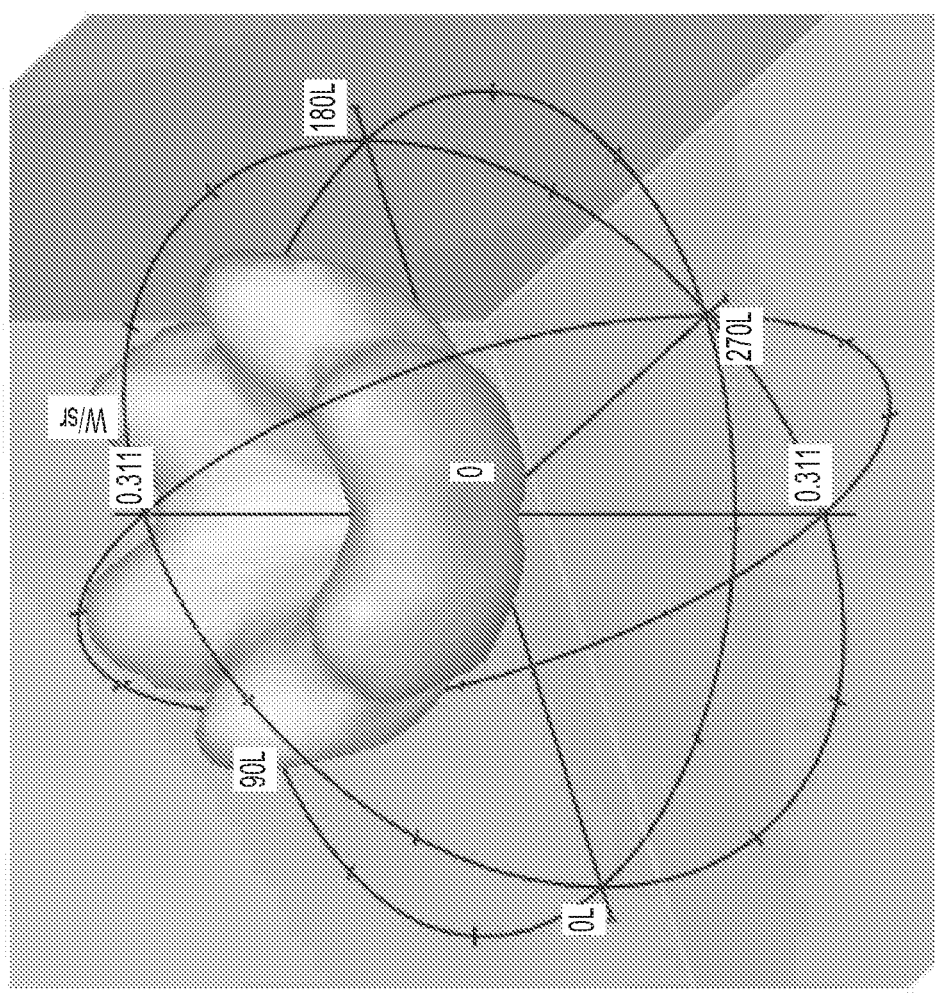
FIG. 15B illustrates an isometric view of a transferred batwing intensity distribution three-dimensional polar chart for the embodiment of FIG. 15A.
Figure 15C:
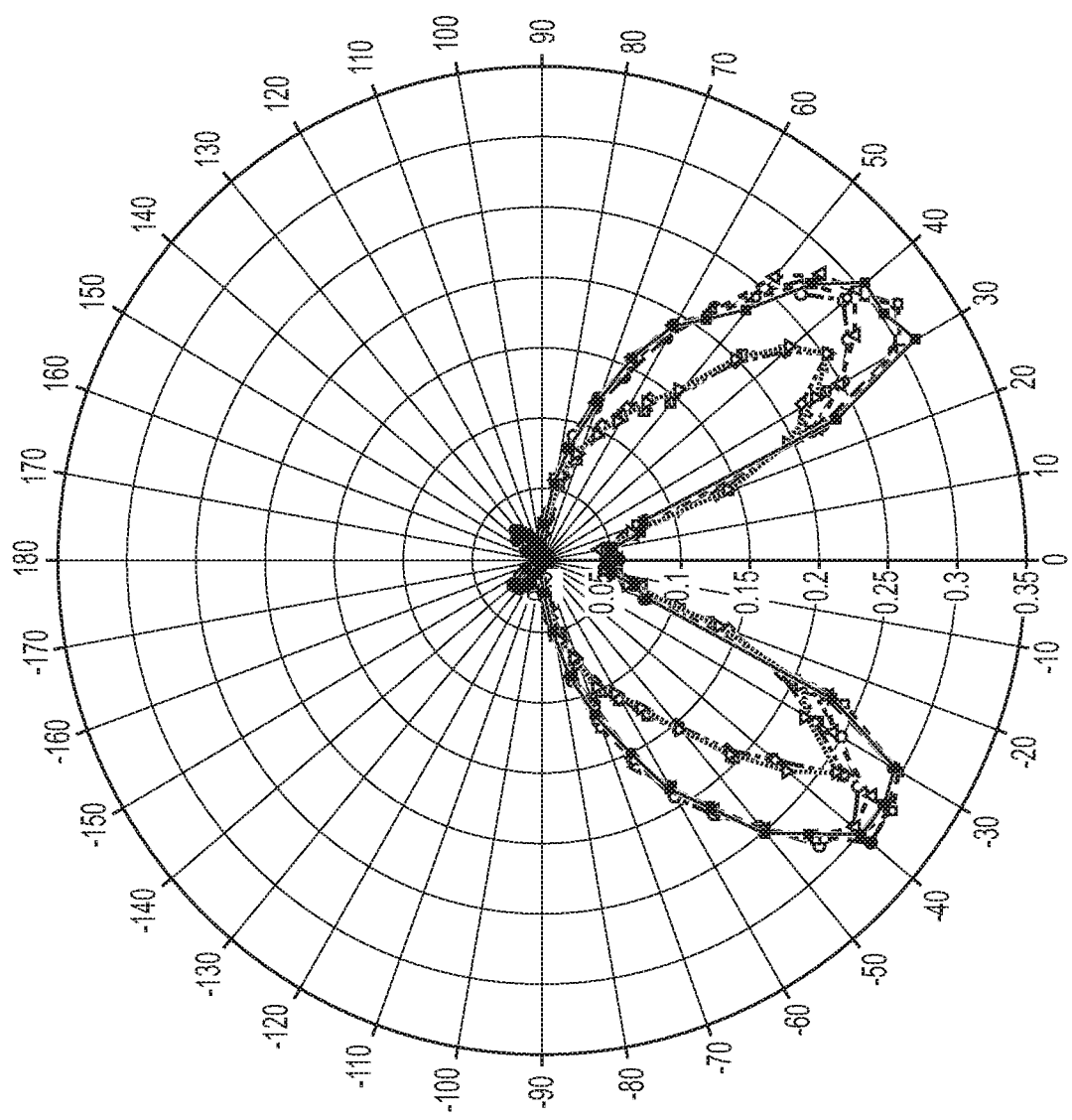
FIG. 15C illustrates a two-dimensional polar chart of the transferred batwing intensity distribution for the embodiment of FIG. 15A with the microstructures having a refractive index of 1.5.

FIG. 15A illustrates an embodiment of a light transmissive substrate 1500 with an array of microstructures 1512 in the form of corner cubes having triangular shaped faces. A representation of the three dimensional transformation of the light distribution provided by the microstructures 1512 having a refractive index of 1.5 is shown in FIG. 15B. FIG. 15C is a 2D polar plot of the light intensity distribution represented by FIG. 15B.

Figure 15D:
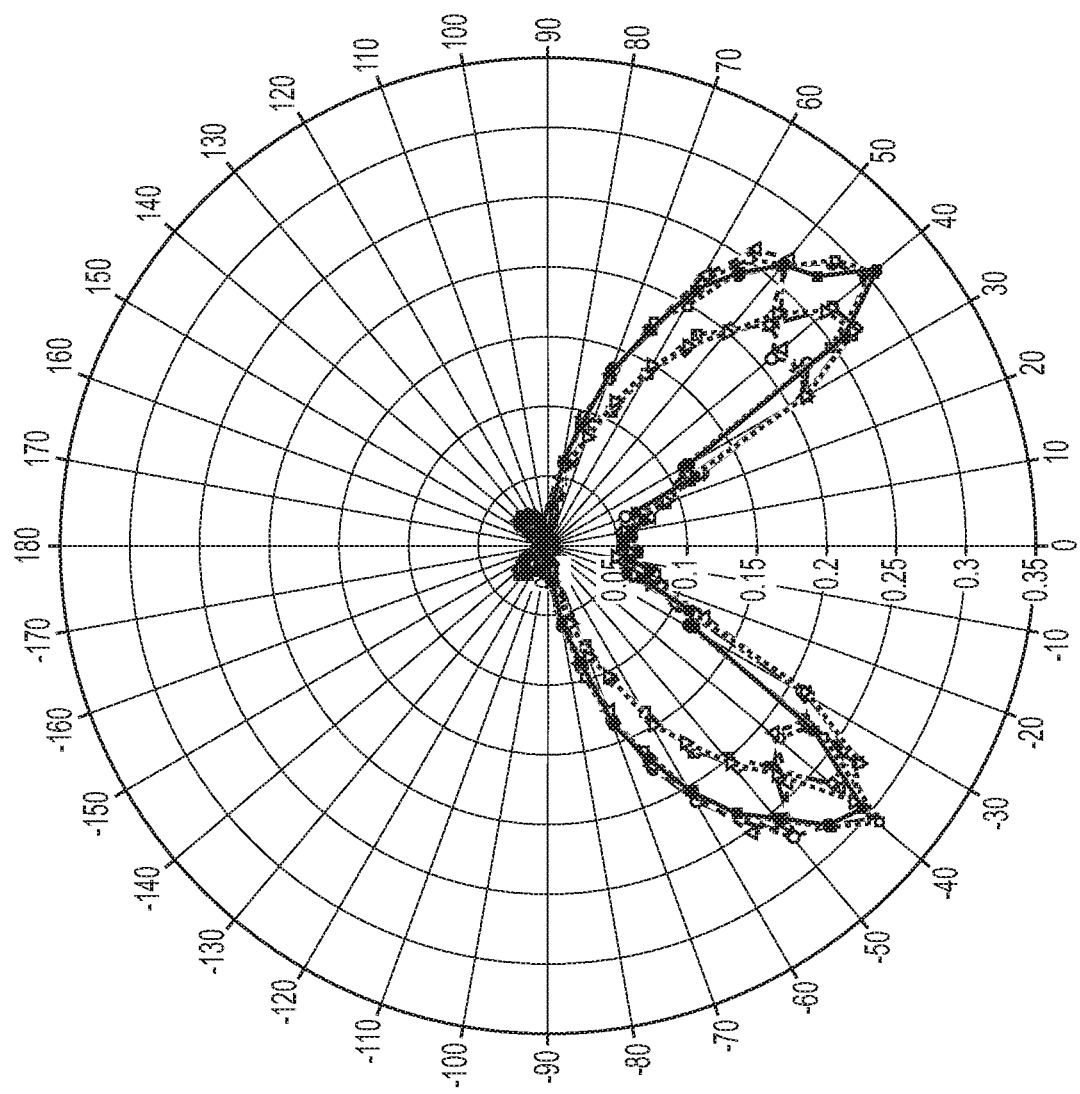
FIG. 15D illustrates a two-dimensional polar chart of the transferred batwing intensity distribution for the embodiment of FIG. 15A with the microstructures having a refractive index of 1.6.

FIG. 15D is a 2D polar plot of a representation of the light intensity distribution provided by the microstructures 1512 having a refractive index of 1.6. A comparison of FIGS. 15C and 15D shows the influence the refractive index has on the batwing spreading performance of the substrate 1500.

The light transmissive structures according to any of the embodiments described herein may be created using many techniques known in the art. For example, in an embodiment, the shape of the microstructures may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding. The microstructures may be produced by replicating a master. For example, an optical diffuser may be made by replication of a master containing the desired shapes as described in U.S. Pat. No. 7,190,387 B2 to Rinehart et al., entitled "Systems And Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of which are incorporated herein by reference in their entirety as if set forth fully herein. The masters themselves may be fabricated using laser scanning techniques described in these patents, and may also be replicated to provide diffusers using replicating techniques described in these patents.

In an embodiment, laser holography, known in the art, may be used to create a holographic pattern that creates the desired microstructures in a photosensitive material. In an embodiment, projection or contact photolithography, such as used in semiconductor, display, circuit board, and other common technologies known in the art, may be used to expose the microstructures into a photosensitive material. In an embodiment, laser ablation, either using a mask or using a focused and modulated laser beam, may be used to create the microstructures including the indicia in a material. In an embodiment, micromachining (also known as diamond machining), known in the art, may be used to create the desired microstructures from a solid material. In an embodiment, additive manufacturing (also known as 3D printing), known in the art, may be used to create the desired microstructure in a solid material.

For any of the embodiments of the light transmissive substrate described herein, roof angles of the microstructures may be adjusted, and or textures may be added to the second surface of the substrate to fine tune the distribution profile and to enhance the optical transmission efficiencies. As described above, the refractive index of the microstructures also has an influence on the batwing spreading performance and may be adjusted to optimize performance.

The embodiments described herein represent a number of possible implementations and examples and are not intended to necessarily limit the present disclosure to any specific embodiments. Instead, various modifications can be made to these embodiments, and different combinations of various embodiments described herein may be used as part of the invention, even if not expressly described, as would be understood by one of ordinary skill in the art.

For example, although four-sided pyramids have been described, it is contemplated that other geometries, such as microstructures having 3, 5 or 6 sides or circular (cone) geometries may be used. Also, it is contemplated that the surfaces of the microstructures may have variations and either in a pattern or random variations or combinations thereof. In some embodiments, the microstructures may have asymmetrical instead of symmetrical shapes and arrays of microstructures may include microstructures having different shapes and/or sizes, either in a pattern or random variations or combinations thereof. Any such modifications are intended to be included within the spirit and scope of the present disclosure and protected by the following claims.

What is claimed is:

1. A light transmissive substrate for transforming a Lambertian light distribution into a batwing light distribution, the light transmissive substrate comprising:
   a) a substrate comprising a first surface comprising a plurality of microstructures forming an array having rows and columns and comprising a second surface on a side of the substrate opposite to the first surface, wherein each of the plurality of microstructures has a shape of a pyramid having a roof angle that extends in a direction away from the second surface, the substrate configured to receive light in a Lambertian distribution from a light source at the first surface and configured to transform the light into a three-dimensional batwing distribution exiting the second surface,
   wherein the roof angle is chosen to provide a desired intensity at nadir and a desired shape of the three-dimensional batwing distribution.

2. The light transmissive substrate according to claim 1 wherein a refractive index of the microstructures is chosen to be in a range of 1.5 to 1.6.

3. The light transmissive substrate according to claim 1 wherein the roof angle is chosen to be in a range of 70° and 100°.

4. The light transmissive substrate according to claim 1 wherein the roof angle of the microstructures is chosen so the desired intensity at nadir is substantially zero.

5. The light transmissive substrate according to claim 1 wherein the roof angle of the microstructures is chosen so that the desired intensity at nadir is greater than zero and less than at least one of the peak intensity at about ±30° to about ±60° from X and Y axes.

6. The light transmissive substrate according to claim 1 wherein at least one microstructure comprises a pyramid having a base portion and a top portion connected to the base portion, wherein the top portion comprises a tip of the pyramid and sides disposed at different angles compared with sides of the base portion.

7. The light transmissive substrate according to claim 1 wherein at least one microstructure comprises a three-section hybrid pyramid.

8. The light transmissive substrate according to claim 1 wherein at least one microstructure comprises a curved-facet-section hybrid pyramid.

9. The light transmissive substrate according to claim 1 wherein at least one microstructure comprises a folded micro-pyramid.

10. The light transmissive substrate according to claim 1 wherein at least one of the second surface of the first substrate and the second surface of the second substrate comprises a textured surface.

11. The light transmissive substrate according to claim 1 wherein each of the plurality of microstructures has a height in a range between 10 micrometers and 50 micrometers.

* * * * *